US012790492B2

(12) United States Patent
Kawasaki

(10) Patent No.: US 12,790,492 B2
(45) Date of Patent: Nov. 10, 2026

(54) PIGMENT DISPERSION COMPOSITION, DISPERSION COMPOSITION, ACTIVE ENERGY RAY CURABLE INK COMPOSITION, PRINTING METHOD, AND PRINTING SYSTEM

(71) Applicant: Konica Minolta, Inc., Tokyo (JP)

(72) Inventor: Hidekazu Kawasaki, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 96 days.

(21) Appl. No.: 18/777,161

(22) Filed: Jul. 18, 2024

(65) Prior Publication Data

US 2025/0034397 A1 Jan. 30, 2025

(30) Foreign Application Priority Data

Jul. 28, 2023 (JP) ................................ 2023-122940

(51) Int. Cl.

| | |
|---|---|
| ***C09D 11/101*** | (2014.01) |
| ***C09B 67/20*** | (2006.01) |
| ***C09B 67/46*** | (2006.01) |
| ***C09D 11/107*** | (2014.01) |
| ***C09D 11/322*** | (2014.01) |
| ***C09D 11/326*** | (2014.01) |
| ***C09D 11/38*** | (2014.01) |

(52) U.S. Cl.
CPC ........ *C09B 67/0069* (2013.01); *C09B 67/009* (2013.01); *C09D 11/101* (2013.01); *C09D 11/107* (2013.01); *C09D 11/322* (2013.01); *C09D 11/326* (2013.01); *C09D 11/38* (2013.01)

(58) Field of Classification Search
CPC . C09B 67/0069; C09B 67/009; C09D 11/101; C09D 11/107; C09D 11/322; C09D 11/326; C09D 11/38
See application file for complete search history.

(56) References Cited

FOREIGN PATENT DOCUMENTS

| | | | | |
|---|---|---|---|---|
| JP | 2009263447 A | * 11/2009 | ............. | C09D 11/00 |
| JP | 2012-107157 A | 6/2012 | | |
| WO | WO-2009123008 A1 | * 10/2009 | ........... | C09D 11/322 |
| WO | WO-2021171876 A1 | * 9/2021 | .......... | B41M 5/0017 |

* cited by examiner

*Primary Examiner* — Yaovi M Ameh
(74) *Attorney, Agent, or Firm* — LUCAS & MERCANTI, LLP

(57) ABSTRACT

A pigment dispersion composition includes, a pigment; a dispersant; and a dispersion medium, wherein, the pigment includes a sulfo group or a sulfonic acid derivative group, and the dispersant is polyallylamine including an alkyl ester side chain. In one embodiment, the dispersion medium is acrylate or methacrylate. In one embodiment, a 1-octanol/water partition coefficient C Log P value, which is a predicted value, of the dispersion medium is in a range of 2.0 to 2.4.

10 Claims, 1 Drawing Sheet

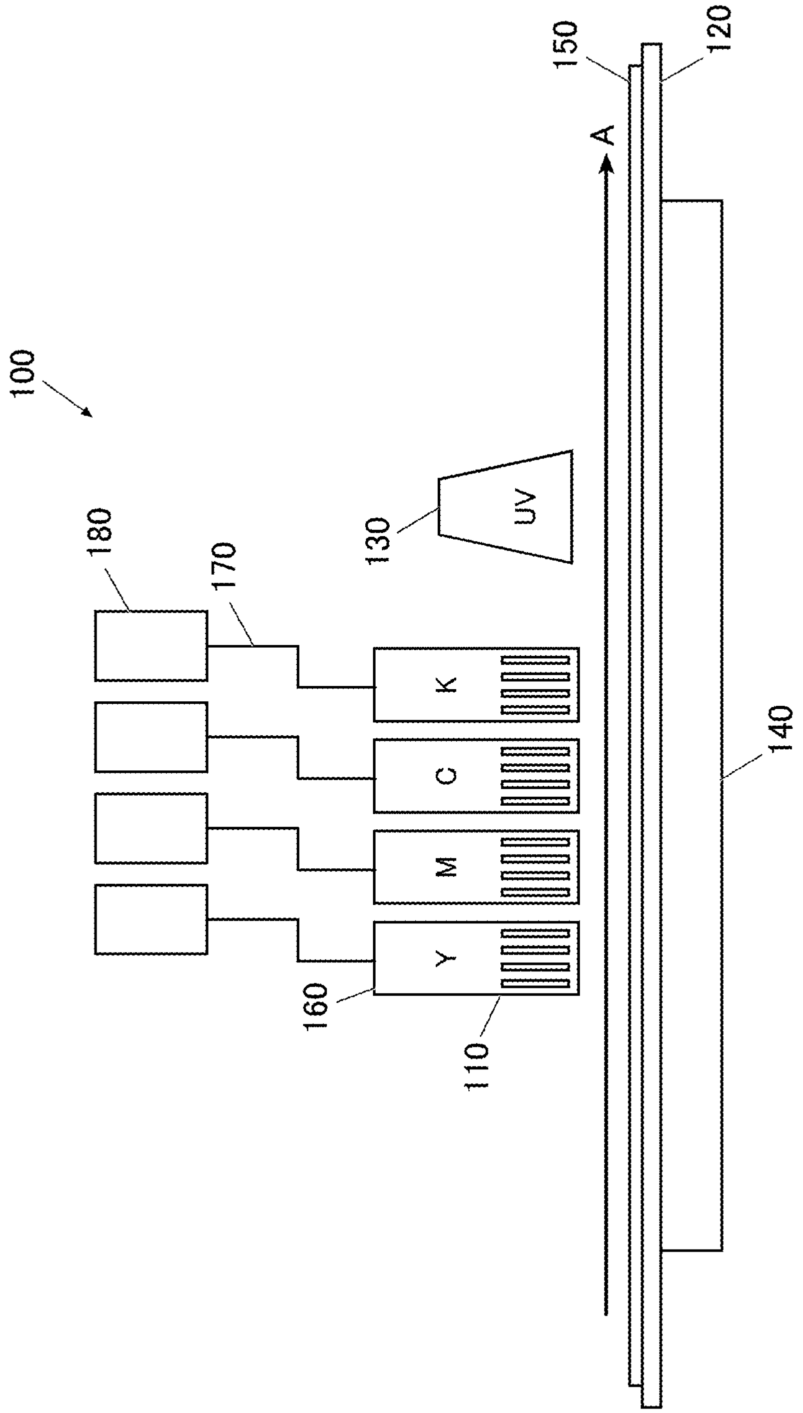
100
180
170
130
UV
K
C
M
Y
160
110
150
120
A
140

PIGMENT DISPERSION COMPOSITION, DISPERSION COMPOSITION, ACTIVE ENERGY RAY CURABLE INK COMPOSITION, PRINTING METHOD, AND PRINTING SYSTEM

CROSS-REFERENCE TO RELATED APPLICATIONS

The entire disclosure of Japanese Patent Application No. 2023-122940, filed on Jul. 28, 2023, including description, claims, drawings and abstract is incorporated herein by reference.

BACKGROUND OF THE INVENTION

Technical Field

The present invention relates to a pigment dispersion composition, a dispersion composition, an active energy ray curable ink composition, a printing method, and a printing system. More particularly, the present invention relates to a pigment dispersion composition having improved dispersibility of a pigment, and the like.

Description of Related Art

Inkjet printing methods are used in various printing fields because images can be formed easily and inexpensively. As a type of ink used in the inkjet printing method, an active energy ray curable ink is exemplified. In the present specification, the "active energy ray curable ink" is also simply referred to as "ink".

With an active energy ray curable ink, ink droplets are landed on a printing medium and then cured by irradiation with active energy rays to form an image. To form an image even on a non-absorbent printing medium is possible by an inkjet printing method using an active energy ray curable ink. Thus, an image having high abrasion resistance and adhesion can be formed. Therefore, the active energy ray curable ink has attracted attention in recent years.

The active energy ray curable ink contains a pigment. Pigments are superior to dyes in terms of fastness due to their characteristics such as heat resistance and weather resistance. On the other hand, in an ink containing a pigment, it is necessary to prevent aggregation of the pigment, precipitation of the pigment, an increase in viscosity of the ink over time, and the like.

In Japanese Unexamined Patent Publication No. 2012-107157, there is disclosed a technology on a pigment composition containing a specific gold-containing azo-pigment dispersant and the like. However, there has been a problem in stability of the pigment composition under a high-temperature environment. In addition, in a printed product formed using an ink containing a pigment, when the dispersibility of the pigment is not sufficient, the pigment or the like cannot be sufficiently fixed to a printing medium, and is easily moved from the printing medium. Such a phenomenon is called "migration". In a printed product formed using an ink containing the pigment composition, further suppression of migration has been required.

SUMMARY OF THE INVENTION

The present invention has been made in consideration of the above-mentioned problems and situations. The problem to be solved is to provide a pigment dispersion composition, a dispersion composition, an active energy ray curable ink composition, a printing method, and a printing system, having improved pigment dispersibility.

To achieve the object, the present inventors have studied the causes of the above problems and the like. In a pigment dispersion composition containing a pigment, a dispersant and a dispersion medium, the pigment has a sulfo group or a sulfonic acid derivative group, and the dispersant is polyallylamine having an alkyl ester side chain. Thus, it has been found that the dispersibility of the pigment can be improved, thereby completing the present invention.

That is, the above-described problems according to the present invention are solved by the following means.

According to one aspect, a pigment dispersion composition includes: a pigment; a dispersant; and a dispersion medium, wherein, the pigment includes a sulfo group or a sulfonic acid derivative group, and the dispersant is polyallylamine including an alkyl ester side chain.

According to another aspect, a dispersion composition includes: a dispersant; and a dispersion medium, wherein, the dispersant is a polyallylamine having an alkyl ester side chain, and a 1-octanol/water partition coefficient C Log P value, which is a predicted value, of the dispersion medium is in a range of 2.0 to 2.4.

According to another aspect, an active energy ray curable ink composition includes: the pigment dispersion composition according to the above.

According to another aspect, a printing method includes: the active energy ray curable ink composition according to the above.

According to another aspect, a printing system includes: the active energy ray curable ink composition according to the above.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein:

FIGURE is a schematic diagram illustrating an exemplary configuration of a printing apparatus 100.

DETAILED DESCRIPTION

Hereinafter, one or more embodiments of the present invention will be described with reference to the drawings. However, the scope of the invention is not limited to the disclosed embodiments.

A pigment dispersion composition of the present invention is a pigment dispersion composition containing a pigment, a dispersant, and a dispersion medium. The pigment has a sulfo group or a sulfonic acid derivative group, and the dispersant is allylamine having an alkyl ester side chain.

This feature is a technical feature common to or corresponding to the following embodiments.

In an embodiment of the present invention, the dispersion medium is preferably acrylate or methacrylate from the viewpoint of preparing an active energy ray curable ink composition using the pigment dispersion composition.

In an embodiment of the present invention, from the viewpoint of affinity between the dispersant and the dispersion medium, the 1-octanol/water partition coefficient C Log P value, which is a predicted value, of the dispersion medium is preferably within a range of 2.0 to 2.4.

In an embodiment of the present invention, from the viewpoint of the affinity between the dispersant and the dispersion medium, in the pigment dispersion composition, the acrylate or methacrylate preferably has a repeating structure derived from ethylene oxide or propylene oxide.

In an embodiment of the present invention, from the viewpoint of the affinity between the dispersant and the dispersion medium, in the pigment dispersion composition, the dispersant preferably has a repeating structure represented by the following general formula (1).

GENERAL FORMULA (1)

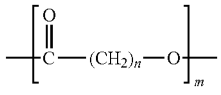

(In general formula (1), m represents an integer within a range of 2 to 100, and n represents an integer within a range of 2 to 20.)

A dispersion composition of the present invention is a dispersion composition containing a dispersant and a dispersion medium. The dispersant is allylamine having an alkyl ester side chain, and a 1-octanol/water partition coefficient C Log P value, which is a predicted value, of the dispersion medium is in a range of 2.0 to 2.4.

An active energy ray curable ink composition according to the present invention includes the pigment dispersion composition.

In an embodiment of the present invention, from the viewpoint of fixing of the ink on a printing medium, the active energy ray curable ink composition preferably further contains a gelling agent.

A method of producing an active energy ray curable ink composition according to the present invention is characterized by including a step of preparing a pigment dispersion composition, and producing the active energy ray curable ink composition.

The printing method of the present invention is characterized by using the active energy ray curable ink composition.

A printing system according to the present invention includes the active energy ray curable ink composition.

By the above-described means of the present invention, it is possible to provide a pigment dispersion composition, a dispersion composition, an active energy ray curable ink composition, a printing method, and a printing system in which the dispersibility of a pigment is improved.

The expression mechanism or action mechanism of the effect of the present invention is not clear, but it is presumed as follows.

In order to stably disperse a pigment in a dispersion medium, a dispersant is required. The dispersant has affinity for both the pigment and the dispersion medium. In general, a cationic dispersant is known as a dispersant for a pigment having a sulfo group or a sulfonic acid derivative group. However, the cationic dispersant has high polarity and has low affinity for some kinds of dispersion media. Therefore, it is difficult to stably disperse the pigment having a sulfo group or a sulfonic acid derivative group.

In particular, when the dispersion medium is an EO-modified, PO-modified, or alkyl chain-containing (meth) acrylate, it is difficult to stably disperse the pigment. In the present specification, "EO-modified" in (meth) acrylate refers to a structure having an oxyethylene group ($-CH_2-CH_2-O-$). The term "PO-modified" refers to a structure having an oxypropylene group ($-CH_2-CH(CH_3)-O-$). Details of the EO-modified and the PO-modified will be described later.

In particular, EO-modified, PO-modified, or alkyl chain-containing (meth) acrylates are often contained in the active energy ray curable ink compositions. That is, in the active energy ray curable ink composition, improvement in dispersibility of the pigment having a sulfo group or a sulfonic acid derivative group has been required.

The dispersant according to the present invention is an allylamine having an alkyl ester side chain. The dispersant has high affinity for a pigment having a sulfo group or a sulfonic acid derivative group. Furthermore, the dispersant has high affinity for the EO-modified, PO-modified, or alkyl chain-containing (meth) acrylate serving as a dispersion medium. Specifically, the dispersion medium and the hydrophobic portion of the dispersant have high affinity. Therefore, it is considered that a balance among the three, that is, the pigment-the dispersant-the dispersion medium is kept, and thus the dispersibility of the pigment is improved.

Hereinafter, the present invention, constituent elements thereof, and modes and aspects for carrying out the present invention will be described in detail. In the present description, when two numbers are used to indicate a range of value before and after "to", these numbers are included in the range as the lower limit value and the upper limit value.

1. Outline of Pigment Dispersion Composition

A pigment dispersion composition of the present invention is a pigment dispersion composition containing a pigment, a dispersant, and a dispersion medium. The pigment has a sulfo group or a sulfonic acid derivative group, and the dispersant is allylamine having an alkyl ester side chain.

In the present invention, the term "dispersant" refers to an additive for uniformly dispersing the pigment in the pigment dispersion composition in the dispersion medium. When the dispersant is contained, aggregation or precipitation of the pigment can be suppressed. In addition, the viscosity of the pigment dispersion composition can be reduced, and the stability is improved. Hereinafter, it is also referred to as "polyallylamine dispersant".

In the present invention, the term "dispersion medium" refers to a medium in which a pigment, which is a dispersoid, is dispersed.

The pigment dispersion composition of the present invention can be mixed with other components as necessary and processed. Examples of the processed product include printing ink, paint, and colored plastic products. In the present specification, an active energy ray curable ink used for printing by an inkjet method will be described. Provided that the pigment dispersion composition of the present invention is also applicable to ink used in other printing methods.

2. Configuration of Pigment Dispersion Composition

The pigment dispersion composition of the present invention contains a pigment, a dispersant, and a dispersion medium.

The pigment, the dispersant, and the dispersion medium are each described below.

(1) Pigment

The pigment according to the present invention has a sulfo group or a sulfonic acid derivative group.

Hereinafter, the "sulfo group or sulfonic acid derivative group" is also referred to as "sulfo group or the like".

In the present invention, the term "sulfonic acid derivative group" refers to a functional group in which a hydrogen atom of a sulfo group ($-SO_3H$) has been replaced by another atom or substituent. Further, the sulfo group may form a salt.

In the present invention, the term "pigment" refers to a substance that has a coloring function and is insoluble in water and organic solvents. The pigment may be formed of one type of compound or two or more types of compounds. The pigment may be in the form of particles, and may further be in the form of particles having an additive adsorbed on the surface thereof. In the present invention, at least one of the compounds constituting the pigment has a sulfo group or the like in its structure.

Typical pigments include pigments listed in the Color Index. Note that the "Color Index" is a database of color materials constructed by the Society of Dye and Dyeing, United Kingdom and the Society of Textile Science and Technology and Dyeing Technology, USA. Of the pigments listed in the Color Index, a pigment having a sulfo group or the like in its chemical structure can be used in the present invention.

Specifically, in one example, an anthraquinone derivative (alizarin red S) represented by the formula of the following compound (a) is included. The color index number of the anthraquinone derivative represented by the formula of the following compound (a) is C. I. 58005.

COMPOUND (a)

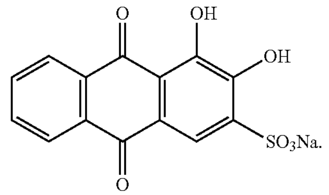

In addition, examples of the pigment having a sulfo group or the like include a pigment into which a sulfo group or the like is introduced by surface modification of particles. In addition, a pigment in which an additive having a sulfo group or the like is adsorbed on the surface of a particle is exemplified. That is, in a conventionally known pigment, a sulfo group or the like can be introduced into the pigment by surface-modifying the pigment particle or adsorbing the additive to the pigment particle.

The conventionally known pigment is not particularly limited, and may be an inorganic pigment or an organic pigment. Examples of the inorganic pigments include titanium dioxide, iron oxide, cadmium sulfide, calcium carbonate, barium carbonate, barium sulfate, clay, talc, yellow lead and carbon black. In addition, examples of the organic pigment include azo pigments, diazo pigments, condensed azo pigments, thioindigo pigments, indanthrone pigments, quinacridone pigments, anthraquinone pigments, benzimidazolone pigments, perylene pigments, perinone pigments, phthalocyanine pigments, halogenated phthalocyanine pigments, anthrapyridine pigments, and dioxazine pigments.

(Surface Modification)

In the pigment according to the present invention, the polyallylamine dispersant can be easily adsorbed to the pigment particles by introducing a sulfo group or the like into the particles by surface modification.

For the surface modification, a conventionally known method can be used. Examples of the surface modification method include a method of subjecting the surface of the pigment particle to an oxidation treatment, a method of subjecting the surface to a surface treatment with a treatment agent such as a silane coupling agent having a sulfo group, and a method of subjecting the surface to a surface coupling treatment with an aromatic diazonium salt having a sulfo group.

Other examples of the surface modification method include a rosin treatment. In the present invention, a sulfonated rosin is used. Here, a residue obtained by collecting balsams such as pine resin (sap of a plant family Pinaceae) and distilling turpentine essential oil is referred to as "rosin". Rosin is a natural resin containing abietic acid, palustric acid, isopimaric acid, or the like as a main component. The pigment particles are preferably surface-modified with a sulfonated rosin. Provided that the strength of the bond between the pigment particles and the sulfonated rosin is not particularly limited, and the pigment particles and the sulfonated rosin may interact with each other via a relatively weak bond such as a hydrogen bond.

(Additive)

In the pigment according to the present invention, an additive is adsorbed on the particles thereof to introduce a sulfo group or the like, so that a polyallylamine dispersant can be easily adsorbed on the pigment particles. As the additive, a commercially available additive or an additive synthesized by a conventionally known method can be used.

An example of the additive will be described. However, the present invention is not limited thereto.

In a case where the pigment particles contain copper phthalocyanine, a sulfo group or the like can be introduced by adding a copper phthalocyanine sulfonic acid derivative. Since moieties having a common structure in the copper phthalocyanine and the copper phthalocyanine sulfonic acid derivative interact with each other, the copper phthalocyanine sulfonic acid derivative is adsorbed onto the pigment particle. Examples of the method for synthesizing the copper phthalocyanine sulfonic acid derivative include a method for sulfonating copper phthalocyanine with concentrated sulfuric acid or fuming sulfuric acid. Another example is a method in which copper phthalocyanine is sulfochlorinated with chlorosulfonic acid and then hydrolyzed with water.

In a case where the pigment particles contain carbon black, a sulfo group or the like can be introduced by adding a sulfonic acid derivative of a styrene-based dispersant. Since the carbon black having a structure in which a π plane spreads and the sulfonic acid derivative of the styrene-based dispersant having π electrons have a π-π interaction (stacking), the sulfonic acid derivative of the styrene-based dispersant is adsorbed to the pigment particles.

Specific examples of the pigment according to the present invention will be described.

Examples of cyan pigments include sulfonated products such as Pigment Blue 15:3 and Pigment Blue 15:4. Examples of commercially available products of cyan pigments include "Paliogen (registered trademark) Blue EH 1900", "Heliogen (registered trademark) Blue D-7086, D7110F", and "FASTOGEN (registered trademark) Blue 5452K" (all manufactured by DIC Corporation). Furthermore, examples of commercially available products of cyan pigments include "LIONOL BLUE FG-7400-G, FG-7397-G" and "LIONOGEN BLUE LX-8059" (which are manufactured by Toyo Ink Co., Ltd).

Examples of the magenta pigment include sulfonated products of perylene, quinacridone, naphthol, carmine, and the like. Examples of commercially available products of magenta pigments include "Chromofine (registered trademark) Red 6112JC" (manufactured by Dainichiseika Color & Chemicals Mfg. Co., Ltd), "FASTOGEN (registered trademark) SUPER MAGENTA RGT, JM04", "FASTOGEN (registered trademark) SUPER RED BRZ" (all manufactured by DIC Corporation), "5R-763", "5R-780", and "6B 690" (all manufactured by Fuji Pigment Co., Ltd), and the like.

Examples of the black pigment include carbon black. Examples of commercially available products of black pigments include "Mitsubishi (registered trademark) Carbon Black MA-7" (manufactured by Mitsubishi Chemical Corporation).

Furthermore, the pigments according to the present invention may be synthesized by a method described in Journal of The Chemical Society of Japan, vol. 1972, no. 9, 1972, p. 1712-1717, Japanese Unexamined Patent Publication No. H 10-110129, Japanese Unexamined Patent Publication No. 2011-225834, Japanese Patent No. 7188661, or the like.

(2) Dispersant

The ink according to the present invention contains a polyallylamine having an alkyl ester side chain as a dispersant. In addition, the ink of the present invention may contain other dispersants as necessary to the extent that the effects are not impaired.

Although details will be described later, for example, the polyallylamine derivative described below is a reaction product of alkyl ester or alkyl ester amide and polyallylamine. The polyallylamine has an amino group exhibiting basicity. Some of the amino groups of the polyallylamine react with the alkyl ester or the alkyl ester amide to form a salt or an acid amide. Thus, a solvating function can be imparted to the polyallylamine. In addition, since some of the amino groups do not react and remain as amino groups, they are sufficiently adsorbed to the pigment. Therefore, it sufficiently functions as a pigment dispersant.

The dispersant preferably has a function of suppressing aggregation of the pigment by steric hindrance, in addition to the function of adsorbing to the pigment and the function of solvating the pigment. Therefore, the pigment dispersant is preferably a polymer compound.

The content of the dispersant is preferably in a range of 10 to 60% by mass with respect to the total mass of the pigment. When the content of the dispersant is 10% by mass or more, the dispersion stability of the pigment is improved. When the content of the dispersant is 60% by mass or less, the ejection stability of the ink from the inkjet head is improved.

(2.1) Constituent Components of Polyallylamine Derivative

Specifically, the dispersant according to the present invention is a compound obtained by modifying an amino group in a side chain of polyallylamine. The component that modifies the amino group is an alkyl ester or a co-condensate of an alkyl ester and a polyamide (alkyl ester amide).

Hereinafter, the "compound obtained by modifying an amino group of a side chain of polyallylamine" is also simply referred to as a "polyallylamine derivative".

The polyallylamine derivative has a structure represented by the following general formula (I).

GENERAL FORMULA (I)

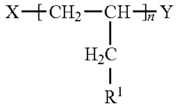

In general formula (I), X and Y each independently represent a hydrogen atom, a polymerization initiator residue, or a chain transfer catalyst residue. $R^1$ is a group represented by the following general formula (II) or (III). "n" represents an integer within a range of 2 to 1000. However, at least one of n of the $R^1$ has a group represented by the general formula (III).

GENERAL FORMULA (II)

$$*—\overset{+}{N}H_3\ \ \overset{-}{O}CO—R^2$$

GENERAL FORMULA (III)

$$*—NHCO—R^2$$

In the general formula (II) and (III), $R^2$ represents a residue obtained by removing a carboxyl group from an alkyl ester or an alkyl ester amide. * represents the position of the carbon bonded to $R^1$.

Note that the general formula (II) shows that an amino group is modified by an ionic bond.

The polyallylamine derivative is obtained by reacting polyallylamine with an alkyl ester or an alkyl ester amide. Hereinafter, each component will be described.

(2.1.1) Polyallylamine

The polyallylamine is obtained by polymerizing polyallylamine in the presence of a polymerization initiator, and in some cases, in the presence of a chain transfer catalyst.

The polymerization initiator is not particularly limited, and examples thereof include ketone peroxides such as methylethyl ketone; diacyl peroxides such as benzoyl peroxide; peroxydicarbonates such as diisopropylperoxydicarbonate; peroxyketals such as 1,1-bis (t-butylperoxy) cyclohexane; hydroperoxides such as t-butyl hydroperoxide; peroxyesters such as t-butyl peroxypivalate; and others such as azobisisoptilinolitrile; hydrogen peroxide; ferrous salts, etc. In addition, polymerization initiators described in Japanese Examined Patent Publication No. H2-14364 may also be used.

The chain transfer catalyst is not particularly limited, and examples thereof include alkyl mercaptans such as lauryl mercaptan; thiocarboxylic acids such as mercaptoacetic acid, 2-mercaptopropionic acid, and 3-mercaptopropionic acid; and thiocarboxylic acid esters such as butyl thioglycolate and 2-ethylhexyl thioglycolate.

The number average molecular weight of the polyallylamine is not particularly limited as long as it is in the range of 150 to 100,000, but is preferably in the range of 600 to 20,000.

When the number average molecular weight is 150 or more, sufficient adsorption to a pigment is obtained. In addition, when the number average molecular weight is 100,000 or less, aggregation of pigments can be suppressed.

As the polyallylamine, a commercially available product may be used. Commercially available products include, for example, those available from Nitto Boseki Co., Ltd., "PAA-1 LV"; "PA-1 L"; "PA-1 LV"; "PAA-1. 4 L"; "PAA 10C"; "PAA-15"; "PAA 15B"; "PAA-L"; "PAA-H"; "PAA-1 L-15C".

Furthermore, a polyallylamine having any molecular weight may be synthesized using the method described in Japanese Examined Patent Publication No. H2-14364.

(2.1.2) Alkyl Ester

The alkyl ester preferably has a structure represented by the following general formula (IV), which is a structure derived from a hydroxy fatty acid. In addition to the structure represented by the following general formula (IV), it may have a structure represented by the following general formula (V). Further, in the alkyl ester, repeating structures represented by the following general formulas (IV) and (V) may be randomly polymerized.

GENERAL FORMULA (IV)

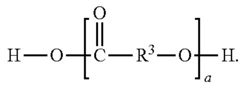

In the general formula (IV), $R^3$ represents a linear or branched alkylene group having 2 to 20 carbon atoms. “a” represents an integer of 2 to 100.

GENERAL FORMULA (V)

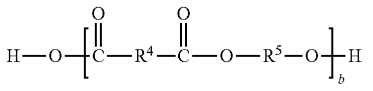

In the general formula (V), $R^4$ represents the alkylene group, $—C_6H_4—$, or —CH═CH—, where the number of carbon atoms is 2 to 20. $R^5$ represents the alkylene group having 2 to 20 carbon atoms, or a residue obtained by removing two hydroxy groups from polyalkylene glycol. In $R^4$ and $R^5$, the alkylene group may be linear or branched. “b” represents an integer of 2 to 100. Further, it may have an ether bond in the chain.

The alkyl ester in the alkyl ester amide preferably has a structure represented by the above general formula (IV), which is a structure derived from a hydroxy fatty acid. In addition to the structure represented by general formula (IV), the structure represented by general formula (V) may be included. In the alkyl ester, the repeating structures represented by the general formulas (IV) and (V) may be randomly polymerized.

The polyamide in the alkyl ester amide has, for example, the structure represented by the following general formula (VI) or (VII). Further, in the polyamide, repeating structures represented by the following general formulas (VI) and (VII) may be randomly polymerized.

GENERAL FORMULA (VI)

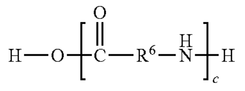

In the general formula (VI), $R^6$ represents the linear or branched alkylene group having 2 to 20 carbon atoms. “c” represents an integer of 2 to 100.

GENERAL FORMULA (VII)

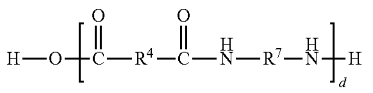

In the general formula (VII), $R^4$ represents the alkylene group, $—C_6H_4—$, or —CH═CH—, where the number of carbon atoms is 2 to 20. $R^7$ represents the alkylene group having 2 to 20 carbon atoms. In $R^4$ and $R^7$ the alkylene group may be linear or branched. “d” represents an integer of 2 to 100.

(2.1.2.1) Method for Synthesizing Alkyl Ester

Synthesis of the alkyl esters having the structures represented by the above general formulae (IV) and (V) will be described.

(2.1.2.1.1) Synthesis of Alkyl Ester Having Structure Represented by General Formula (IV)

The alkyl ester having a structure represented by the above general formula (IV) can be synthesized using a hydroxy fatty acid having a structure represented by the following general formula (VIII) or a lactone represented by the following general formula (IX) as a raw material. Note that the lactone represented by the following general formula (IX) can be synthesized by dehydration condensation of the hydroxy group and the carboxy group in a molecule of the hydroxy fatty acid.

Specifically, the alkyl ester can be synthesized by adding a polymerization catalyst to each of the hydroxy fatty acid alone, the lactone alone, or a mixture of the hydroxy fatty acid and the lactone, and heating the mixture. The reaction temperature is preferably within a range of 120 to 220° C., more preferably within a range of 160 to 210° C.

Furthermore, the reaction time is preferably within a range of 0.5 to 72 hours. The degree of polymerization can be increased by performing the reaction under a nitrogen airflow. In addition, the use of the polymerization initiator facilitates the control of the reaction. When the lactone is used as the raw material, the amount of the monocarboxylic acid as the polymerization initiator is preferably 0.5 mol or less with respect to 1 mol of the lactone.

GENERAL FORMULA (VIII)

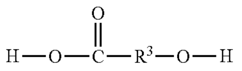

GENERAL FORMULA (IX)

In the general formula (VIII) and the general formula (IX), $R^3$ represents the linear or branched alkylene group having 2 to 20 carbon atoms.

Examples of the hydroxy fatty acids include glycolic acid; 2-hydroxycaproic acid; ricinoleic acid; ricinolenic acid; mixtures of 9 and 10-hydroxystearic acid; 12-hydroxystearic acid; castor oil fatty acid; hydrogenated castor oil fatty acid and lactic acids.

Lactones include, for example, ε-caprolactone, β-propiolactone, γ-butyrolactone, δ-valerolactone, β-methyl-δ-valerolactone, 4-methylcaprolactone, 2-methylcaprolactone, etc.

Polymerization catalysts include, for example, quaternary ammonium salts such as tetramethylammonium chloride, tetrabutylammonium chloride, tetramethylammonium bromide, tetrabutylammonium bromide tetramethylammonium iodide, tetrabutylammonium iodide, benzyltrimethylammonium chloride, benzyltrimethylammonium bromide, and benzyltrimethylammonium iodide; quaternary phosphonium salts such as tetramethylphosphonium chloride, tetrabutylphosphonium chloride, tetramethylphosphonium bromide, tetrabutylphosphonium bromide, tetramethylphosphonium iodide, tetrabutylphosphonium iodide, benzyltrimethylphosphonium chloride, benzyltrimethylphosphonium bromide, benzyltrimethylphosphonium iodide, tetraphenylphosphonium chloride, tetraphenylphosphonium bromide, and tetraphenylphosphonium iodide; phosphorus compounds such as triphenylphosphine; organic carboxylates such as potassium acetate, sodium acetate, potassium benzoate, and sodium benzoate; alkali metal alcoholates such as sodium alcoholates, and potassium alcoholates; tertiary amines; organotin compounds; organoaluminum compounds; organotitanate compounds; zinc compounds such as zinc chloride; and the like.

Examples of the polymerization initiator include monocarboxylic acids, for example, aliphatic monocarboxylic acids such as acetic acid, propionic acid, caprylic acid, nonanoic acid, capric acid, octylic acid, lauric acid, myristic acid, palmitic acid, stearic acid, isononanoic acid, and arachic acid; and aromatic monocarboxylic acids such as benzoic acid and p-butylbenzoic acid.

(2.1.2.1.2) Synthesis of Alkyl Ester Having Structure Represented by General Formula (V)

The alkyl ester having the structure represented by the general formula (V) can be synthesized by reacting a dibasic acid having a structure represented by the following general formula (X) and a diol having a structure represented by the following general formula (XI).

Specifically, it can be synthesized by adding a polymerization catalyst to a mixture of the above-described dibasic acid and diol, and heating the mixture. Provided that the dibasic acid is preferably added in a slight excess amount. The reaction temperature is preferably within a range of 120 to 220° C., more preferably within a range of 160 to 210° C. Furthermore, the reaction time is preferably within a range of 0.5 to 72 hours. The degree of polymerization can be increased by performing the reaction under a nitrogen airflow. In addition, the use of the polymerization initiator facilitates the control of the reaction.

GENERAL FORMULA (X)

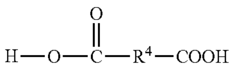

GENERAL FORMULA (XI)

$$H-O-R^5-O-H$$

In the general formula (X), $R^4$ represents the alkylene group, $-C_6H_4-$, or $-CH=CH-$, where the number of carbon atoms is 2 to 20. In the general formula (XI), $R^5$ represents the alkylene group having 2 to 20 carbon atoms, or a residue obtained by removing two hydroxy groups from polyalkylene glycol. In $R^4$ and $R^5$, the alkylene group may be linear or branched.

Examples of the dibasic acid include dibasic acids having an unsaturated bond, such as maleic anhydride and fumaric acid; aromatic dibasic acids, such as phthalic anhydride and terephthalic acid; and saturated dibasic acids, such as adipic acid and sebacic acid.

Examples of the diol include alkylene glycols such as ethylene glycol, propylene glycol, neopentyl glycol, 1,3-butanediol, 1,4-butanediol, 1,6-hexanediol, and ether bond-containing diols such as diethylene glycol; dipropylene glycol and triethylene glycol.

As the polymerization catalyst and the polymerization initiator, those similar to the synthesis of the alkyl ester having the structure represented by the general formula (IV) can be used.

The alkyl ester in which the repeating units represented by the general formulas (IV) and (V) are randomly polymerized can be synthesized by the following method. The polymerization catalyst is added to the mixture of any one of the hydroxy fatty acid alone, the lactone alone, or the mixture of the hydroxy fatty acid and the lactone, and equimolar amounts of the above-described diol and dibasic acid, and the mixture is heated. The reaction conditions are preferably the same as those for the synthesis of the alkyl ester having the structure represented by general formula (IV).

The alkyl ester in which the repeating units represented by the general formula (IV) and the general formula (V) are polymerized in a block form can be synthesized by the following method. The alkyl ester having the structure represented by general formula (IV) and the alkyl ester having the structure represented by general formula (V) are synthesized in advance. Thereafter, these are subjected to dehydration condensation to obtain resin.

The molecular weight of the alkyl ester is preferably within a range of 300 to 20,000. From the viewpoint of the dispersibility of the pigment, the molecular weight is preferably in the range of 1,000 to 10,000. When the molecular weight is within the above range, the side chain of the dispersant can have an appropriate length, and therefore, the dispersibility is excellent. The alkyl ester having a desired molecular weight can be obtained by adjusting the molar ratio among the polymerization initiator, the hydroxy fatty acid, the lactone, the diol, and the dibasic acid as raw materials. In addition, the alkyl ester having a desired molecular weight can be obtained by observing an acid value of the reaction product and adjusting the reaction time during the synthesis reaction of the alkyl ester.

(2.1.2.2) Alkyl Ester Amide

The alkyl ester amide is a co-condensate of the above alkyl ester and the following polyamide. The polyamide can be synthesized by subjecting one or more raw materials of the alkyl ester and one or more raw materials of the polyamide to a polymerization reaction. In addition, the above-described alkyl ester and the following polyamide can also be synthesized by preliminarily condensing each of the above-described alkyl ester and the following polyamide, and further co-condensing these. The reaction conditions are preferably the same conditions as in the synthesis of the polyamide described below. The molecular weight (degree of polymerization) of the alkyl ester amide can be measured by the acid value.

(2.1.2.2.1) Synthesis of Polyamide Having Structure Represented by General Formula (VI)

The polyamide having the structure represented by the general formula (VI) can be synthesized using, as raw materials, a lactam having a structure represented by the following general formula (XII) or an aminocarboxylic acid having a structure represented by the following general formula (XIII).

Specifically, it can be synthesized by heating a lactam alone having a structure represented by the following general formula (XII), an aminocarboxylic acid alone having a structure represented by the following general formula (XIII), or a mixture of a lactam and an aminocarboxylic acid. The polycondensation reaction is preferably performed under a nitrogen airflow. The reaction temperature is preferably within a range of 110 to 250° C., more preferably within a range of 150 to 210° C. When the reaction temperature is 250° C. or lower, coloring of the reaction product can be suppressed, and when the reaction temperature is 110° C. or higher, a sufficient reaction rate can be obtained.

The reaction time is preferably within a range of 0.5 to 72 hours. In addition, the use of the polymerization initiator facilitates the control of the reaction. Furthermore, the reaction time can be shortened by adding the polymerization catalyst. The molecular weight of the polyamide can be measured by the acid value. When a lactam is used as the raw material, the amount of the monocarboxylic acid as the polymerization initiator is preferably 0.5 mol or less with respect to 1 mol of the lactam.

GENERAL FORMULA (XII)

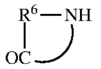

GENERAL FORMULA (XIII)

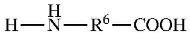

In the general formulas (XII) and (XIII), $R^6$ represents the linear or branched alkylene group having 2 to 20 carbon atoms.

Examples of the lactam include ε-caprolactam and ω-laurolactam. Examples of the aminocarboxylic acid include aminocaproic acid and 11-aminoundecanoic acid. As the polymerization catalyst and the polymerization initiator, those similar to the synthesis of the alkyl ester having the structure represented by the general formula (IV) can be used.

(2.1.2.2.2) Synthesis of Polyamide Having Structure Represented by General Formula (VII)

The polyamide having the structure represented by the general formula (VII) can be synthesized using, as raw materials, the dibasic acid having the structure represented by the general formula (X) and the diamine represented by the following general formula (XIV).

GENERAL FORMULA (XIV)

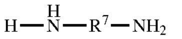

In the general formula (XIV), $R^7$ represents a linear or branched alkylene group having 2 to 20 carbon atoms.

Examples of the diamine include ethylene diamine, 1,4-diaminobutane, and hexamethylene diamine.

In the synthesis of the polyamide having the structure represented by the general formula (VII), the reaction conditions and so on can be similar to those in the synthesis of the polyamide having the structure represented by the general formula (VI) described above.

(2.1.3) Synthesis of Polyallylamine Derivative

An amino group in a side chain of polyallylamine is modified with alkyl ester or alkyl ester amide to synthesize a polyallylamine derivative.

The total amount of the alkyl ester or alkyl ester amide having a free carboxy group is preferably 1 mol or more per 1 mol of the polyallylamine having n amino groups. Provided that n has the same meaning as n in the aforementioned general formula (I) and is an integer within a range of 2 to 1000. Furthermore, from the viewpoint of dispersibility of pigments, the amount of the alkyl ester or alkyl ester amide having a free carboxy group is more preferably within a range of from 2 to 2n mol.

One type of alkyl ester or alkyl ester amide may be used alone, or two or more types may be used in combination. Different types of alkyl esters or alkyl ester amides may be reacted to polyallylamine at the same time. In the reaction, the polymerization catalyst may be used, and as the polymerization catalyst, the same polymerization catalyst as in the synthesis of the alkyl ester having the structure represented by general formula (IV) can be used. As the reaction solvent, a solvent such as xylene or toluene may also be used.

The reaction between the polyallylamine and the alkyl ester or the alkyl ester amide is salt formation or an acid amide bond-forming reaction via a free amino group of the former and a terminal free carboxy group of the latter. Depending on the type of the alkyl ester or alkyl ester amide and the reaction conditions, an ester-amide exchange reaction also occurs simultaneously between the ester of the alkyl ester or alkyl ester amide and the amino group of the side chain of the polyallylamine. In the reaction between the polyallylamine and the alkyl ester or the alkyl ester amide, whether a salt is formed or an acid amide is formed depends on the reaction conditions.

The salt-forming reaction and the acid amide bond-forming reaction proceed simultaneously. The reaction temperature in the acid amide bond-forming reaction is preferably in a range of 90 to 250° C., more preferably in a range of 90 to 210° C., and still more preferably in a range of 100 to 210° C. When the reaction temperature is 250° C. or lower, coloring of the reaction product can be suppressed, and when the reaction temperature is 90° C. or higher, a sufficient reaction rate can be obtained. In addition, a less colored reaction product is obtained by performing the reaction under a nitrogen airflow.

On the other hand, the reaction temperature in the salt-forming reaction is preferably in the range of 20 to 140° C.

The polyallylamine derivative preferably has an acid amide bond. Furthermore, from the viewpoint of pigment dispersibility, it is preferable that the terminal carboxy group of the alkyl ester or the alkyl ester amide reacts at a ratio of 2 mol or more with respect to 1 mol of the polyallylamine having n amino groups. Provided that n has the same meaning as n in the aforementioned general formula (I) and is an integer within a range of 2 to 1000.

In the above general formula (I), the residue in the form of being bonded by an acid amide bond represented by the above general formula (III) is preferably present in the range of 60 to 95%, more preferably in the range of 65 to 90% in the n pieces of $R^1$.

That is, 60% or more of the amino groups of the polyallylamine are covalently bonded to the alkyl ester or the alkyl ester amide through an amide bond. Thus, aggregation of the pigments can be suppressed, and the pigment can function as the pigment dispersant. In addition, 95% or less of the amino groups of the polyallylamine are covalently bonded to the alkyl ester or the alkyl ester amide through an amide bond. That is, when more than 5% of the amino groups are present as amino groups, the amino groups can be sufficiently adsorbed to the pigment and function as the pigment dispersant.

(Amine Value)

In the polyester derivative, the amino group of the polyallylamine is bonded by a covalent bond within the range described above. For that purpose, the amine value can be calculated by measuring an amine value A immediately after mixing the polyester or polyesteramide having a carboxy group at one end and at least one of the polyallylamines and an amine value B after completion of the reaction, and calculating changes in these values.

$$\text{proportion of covalent bonds of amino groups of polyester derivative } [\%] = \{(A-B)/A\} \times 100 \quad \text{(formula)}$$

The amine value immediately after mixing may be actually measured. Provided that since the reaction does not proceed immediately after the mixing, the amine value of the polyallylamine used as the raw material can also be calculated from the masses of the polyester or polyesteramide added and the polyallylamine used in the reaction. Note that even if a carboxy group of the polyester or the polyester amide and an amino group of the polyallylamine form a salt, there is no effect on the desired amine value.

In the synthesis of the polyallylamine derivative, a mass ratio of the polyallylamine to the alkyl ester or the alkyl ester amide is preferably within a range of 1/5 to 1/30.

The amine value (mgKOH/g) of the polyallylamine derivative is preferably in a range of 2.5 to 50, more preferably in a range of 5 to 30, and even more preferably in a range of 10 to 20, from the viewpoint of pigment dispersibility. An amine value of 2.5 or more can enable sufficient adsorption to the pigment, and an amine value of 50 or less can suppress aggregation of the pigments.

The molecular weight of the polyallylamine derivative is preferably in the range of 2000 to 100000 from the viewpoint of pigment dispersibility.

The polyallylamine derivative may be obtained by directly modifying an amino group of a side chain of polyallylamine with hydroxy fatty acid or lactone. Furthermore, if necessary, a dibasic acid, a diol, an aminocarboxylic acid, a lactam, or a diamine may be further used.

(2.1.4) Specific Example of Dispersant According to the Present Invention

The dispersant according to the present invention may be a commercially available product. Commercially available products of the dispersants include, for example, "Solsperse 24000GR, 24000SC, 32000, 33000" (those available from Japan Lubrizol Corporation), "Ajisper PA111; PB711; PB821; PB822; PB824" (those available from Ajinomoto Fine-Techno Co., Inc.), and the like.

In addition, the dispersant according to the present invention may be compounds described in Japanese Patent No. 1940521, Japanese Patent No. 1570685, Japanese Patent No. 3504268, Japanese Translation of PCT International Publication No. 2003-509205, and the like.

(2.2) Other Dispersants

Examples of the other dispersant which can be used in combination include polymer dispersants other than the above-described dispersants, and surfactants. Among these, the polymer dispersant is preferable.

Examples of the polymer dispersant include (meth) acrylic resin, styrene-(meth) acrylic resin, hydroxy group-containing carboxylic acid ester, salt of long-chain polyaminoamide and high molecular weight acid ester, salts of high molecular weight polycarboxylic acids, salt of long-chain polyaminoamide and polar acid ester, high molecular weight unsaturated acid ester, modified polyurethane, modified polyacrylate, polyether ester type anionic surfactant, naphthalenesulfonic acid formalin condensate salt, aromatic sulfonic acid formalin condensate salt, polyoxyethylene alkyl phosphate ester, polyoxyethylene nonylphenyl ether, stearylamine acetate, and pigment derivatives and the like. Provided that sulfonic acid derivatives among the pigment derivatives correspond to the above-described pigments.

Furthermore, from the viewpoint of improving dispersibility, a dispersion aid may be further contained, if necessary.

(3) Dispersion Medium

The dispersion medium according to the present invention is not particularly limited as long as it is a solvent capable of dispersing the pigment and the dispersant. Provided that the dispersion medium is preferably a solvent used in ink, from the viewpoint of preparing an active energy ray curable ink composition using the pigment dispersion composition. That is, the dispersion medium is preferably a polymerizable compound that can sufficiently disperse the pigment and the dispersant and is cured by irradiation with active energy rays. Hereinafter, the polymerizable compound as the dispersion medium will be described.

Examples of the polymerizable compound include a radically polymerizable compound, a cationically polymerizable compound, or a mixture thereof. The compound includes a monomer, a polymer (oligomer or polymer), or a mixture thereof. The polymerizable compound may be contained alone or in combination of two or more kinds thereof.

The content of the polymerizable compound is preferably in a range of 1 to 97% by mass and more preferably in a range of 30 to 95% by mass with respect to the total mass of the ink.

(C Log P Value)

The polymerizable compound preferably has a 1-octanol/water partition coefficient C Log P value, which is a predicted value, in the range of 2.0 to 2.4. When the C Log P value is within the above range, the dispersibility of pigments is improved.

Here, the "Log P value" is a coefficient indicating the affinity of an organic compound for water and 1-octanol. "P" is the 1-octanol/water partition coefficient. Specifically, in a partition equilibrium state where a trace amount of a compound is dissolved as a solute in a two liquid phase solvent of 1-octanol and water, "P" is a value of a ratio of equilibrium concentrations of the compound in the respective solvents. The logarithm of the 1-octanol/water partition coefficient with respect to the base 10 is denoted by "Log P". That is, the "Log P value" is a logarithmic value of a 1-octanol/water partition coefficient and is known as an important parameter indicating the hydrophilicity/hydrophobicity of a molecule.

The "C Log P value" is a Log P value calculated by calculation and is a predicted value. The C Log P value can be calculated by a fragment method, an atomic approach method, or the like. As a specific method for calculating the C Log P value, a fragment method described in a document (C. Hansch and A. Leo, "Substituent Constants for Correlation Analysis in Chemistry and Biology" (John Wiley & Sons, New York; 1969)) is exemplified.

In addition, a method using the following commercially available software package may be mentioned.

The structural formula of a compound is prepared using Chem Draw Professional Ver.20.0.0.41 (manufactured by Cambridge Soft). Then, the C Log P value can be calculated by the "Chemical Properties" function in the software. Note that the C Log value described in the present specification is a value calculated by the aforementioned method.

(3.1) Radical Polymerizable Compound

The "radically polymerizable compound" refers to a compound having a radically polymerizable ethylenically unsaturated bond. Examples of the radically polymerizable compound include unsaturated carboxylic acid and a salt thereof; an unsaturated carboxylic acid ester compound; an unsaturated carboxylic acid urethane compound; an unsaturated carboxylic acid amide compound and an anhydride thereof; acrylonitrile; styrene; unsaturated polyester; unsaturated polyether; unsaturated polyamide; and unsaturated urethane. Examples of the unsaturated carboxylic acid include; (meth) acrylic acid, itaconic acid, crotonic acid, isocrotonic acid, maleic acid and the like.

Note that in the present specification; (meth) acrylic acid is a generic name for acrylic acid and methacrylic acid, and means one or both of them. The term "(meth) acrylate" is a generic name for acrylate and methacrylate, and means one or both of them. In addition, the term "acrylate" is a general term for acrylate monomers and acrylate oligomers, and means one or both of these. Similarly, the term "methacrylate" is a general term for a methacrylate monomer and a methacrylate oligomer, and means one or both of them.

Among these, the polymerizable compound is preferably an unsaturated carboxylic acid ester compound; and more preferably a (meth) acrylate compound. The (meth) acrylate compound may be not only a monomer described below but also an oligomer, a mixture of a monomer and an oligomer, a modified product, or the like.

(3.1.1) (Meth) Acrylate Compound

Examples of the monofunctional monomeric (meth) acrylate compound include isoamyl (meth) acrylate, stearyl (meth) acrylate, lauryl (meth) acrylate, octyl (meth) acrylate, decyl (meth) acrylate, isomyristyl (meth) acrylate, isostearyl (meth) acrylate, 2-ethylhexyl-diglycol (meth) acrylate, 2-hydroxybutyl (meth) acrylate, 2-(meth) acryloyloxyethyl hexahydrophthalic acid, butoxyethyl (meth) acrylate, ethoxydiethylene glycol (meth) acrylate, methoxydiethylene glycol (meth) acrylate, methoxypolyethylene glycol (meth) acrylate, methoxypropylene glycol (meth) acrylate, phenoxyethyl (meth) acrylate, tetrahydrofurfuryl (meth) acrylate, isobornyl (meth) acrylate, 2-hydroxyethyl (meth) acrylate, 2-hydroxypropyl (meth) acrylate, 2-hydroxy-3-phenoxypropyl (meth) acrylate, 2-(meth) acryloyloxyethyl succinate, 2-(meth) acryloyloxyethyl phthalate, 2-(meth) acryloyloxyethyl-2-hydroxyethyl-phthalic acid, t-butylcyclohexyl (meth) acrylate and the like.

Examples of the (meth) acrylate compound of a bifunctional monomer include triethylene glycol di (meth) acrylate, tetraethylene glycol di (meth) acrylate, polyethylene glycol di (meth) acrylate, tripropylene glycol di (meth) acrylate, polypropylene glycol di (meth) acrylate, 1,4-butanediol di (meth) acrylate, 1,6-hexanediol di (meth) acrylate, 1,9-nonanediol di (meth) acrylate, neopentyl glycol di (meth) acrylate, dimethylol-tricyclodecane di (meth) acrylate, bisphenol A-PO adduct di (meth) acrylate, neopentyl glycol hydroxypivalate di (meth) acrylate, and polytetramethylene glycol di (meth) acrylate.

Examples of the (meth) acrylate compound of a trifunctional or higher polyfunctional monomer include trimethylolpropane tri (meth) acrylate, pentaerythritol tri (meth) acrylate, pentaerythritol tetra (meth) acrylate, dipentaerythritol hexa (meth) acrylate, ditrimethylolpropane tetra (meth) acrylate, glycerolpropoxy tri (meth) acrylate, and pentaerythritol ethoxy tetra (meth) acrylate.

Among these, from the viewpoint of photosensitivity and the like; the (meth) acrylate compound is preferably stearyl (meth) acrylate, lauryl (meth) acrylate, isostearyl (meth) acrylate, ethoxydiethylene glycol (meth) acrylate, isobornyl (meth) acrylate, tetraethylene glycol di (meth) acrylate, or glycerolpropoxy tri (meth) acrylate.

The (meth) acrylate compound may be a modified product. Examples of the modified product include ethylene oxide-modified (meth) acrylate compounds such as ethylene oxide-modified trimethylolpropane tri (meth) acrylate and ethylene oxide-modified pentaerythritol tetraacrylate; caprolactone-modified (meth) acrylate compounds such as caprolactone-modified trimethylolpropane tri (meth) acrylate; and caprolactam-modified (meth) acrylate compounds such as caprolactam-modified dipentaerythritol hexa (meth) acrylate.

Note that the term "modified product" refers to a compound into which a characteristic group (including a functional group, a substituent, a linking group, and the like) has been introduced in order to improve the chemical or physical properties of the main (or base) compound according to the purpose. For example, by forming a modified product, the molecular weight can be adjusted while maintaining the reactivity of the compound.

Among these, the linking group to be introduced is preferably an oxyethylene group ($—CH_2—CH_2—O—$) or an oxypropylene group ($-CH_2—CH(CH_3)—O—$). In addition, it is preferable that a plurality of these are introduced. That is, the (meth) acrylate compound according to the present invention preferably has a repeating structure derived from ethylene oxide or propylene oxide. By having such a structure, the affinity with the dispersant can be further improved.

As an example, structures of phenyl acrylate and phenol EO-modified acrylate are shown. Note that Ph represents a phenyl group. n is an integer of 1 or more.

$CH_2$=CH—COO-Ph (Phenyl Acrylate)

$CH_2$=CH—CO—$(OC_2H_4)$n-O-Ph. (Phenol EO-Modified Acrylate)

The ink of the present invention may be a sol-gel phase transition type ink. In this case, at least a part of the polymerizable compounds is preferably an ethylene oxide-modified (meth) acrylate compound. The ethylene oxide-modified (meth) acrylate compound has high photosensitivity and easily forms a card house structure when the ink gels at a low temperature. In addition, the ethylene oxide-modified (meth) acrylate compound is easily dissolved in other ink components at a high temperature. The ethylene oxide-modified (meth) acrylate compound has small curing shrinkage, and can suppress curling of a printed product.

Examples of the ethylene oxide-modified (meth) acrylate compound include 4EO modified hexanediol diacrylate "CD561" (molecular weight: 358), 3EO modified trimethylolpropane triacrylate "SR454" (molecular weight: 429), 6EO modified trimethylolpropane triacrylate "SR499" (molecular weight: 560), 4EO modified pentaerythritol tetraacrylate "SR494" (molecular weight: 528) (manufactured by Sartomer); polyethylene glycol diacrylate "NK Ester a-400" (molecular weight: 508), polyethylene glycol diacrylate "NK Ester A-600" (molecular weight: 742), polyethylene glycol dimethacrylate "NK ester 9G" (molecular weight: 536), polyethylene glycol dimethacrylate "NK ester 14G" (molecular weight: 770) (manufactured by Shin-Nakamura Chemical Co., Ltd); tetraethylene glycol diacrylate "V #335HP" (manufactured by Osaka Organic Chemical Industry Ltd, molecular weight: 302); 3PO modified trimethylolpropane triacrylate "Photomer (registered trademark) 4072" (manufactured by Cognis Corporation, molecular weight: 471, C log P value: 4.90); 1,10-decanediol dimethacrylate "NK ester DOD-N" (molecular weight: 310, C log P value: 5.75), tricyclodecane dimethanol diacrylate "NK Ester A-DCP" (molecular weight: 304, C log P value: 4.69), tricyclodecane dimethanol dimethacrylate "NK ester DCP" (molecular weight: 332, C log P value: 5.12) (manufactured by Shin-Nakamura Chemical Co., Ltd).

The (meth) acrylate compound may be a polymerizable oligomer. Examples of the polymerizable oligomer include an epoxy (meth) acrylate oligomer, an aliphatic urethane (meth) acrylate oligomer, an aromatic urethane (meth) acrylate oligomer, a polyester (meth) acrylate oligomer, and a linear (meth) acryl oligomer.

The (meth) acrylate compound may be a commercially available product. An example of a commercially available product of the (meth) acrylate compound includes "SR231 NS (diethylene glycol dimethacrylate), C Log P value: 2.04)", "SR212 B (1,3-butylene glycol diacrylate, C Log P value: 2.09)", SR495B NS (caprolactone acrylate, C Log P value: 2.10)", "SR306 NS (tripropylene glycol diacrylate, C Log P value: 2.17)", "SR444D NS (pentaerythritol triacrylate, C Log P value: 2.38)" (manufactured by Sartomer), and the like.

Examples of commercially available products of the (meth) acrylate compound include "Miramer (registered trademark) series". Specific examples thereof include "M222 (dipropylene glycol diacrylate, C Log P value: 2.04)", "M220 (tripropylene glycol diacrylate, C Log P value: 2.17)", "M144 (phenol EO-modified acrylate, C Log P value: 2.27)", "M340 (pentaerythritol triacrylate, C Log P value: 2.38)" (manufactured by MIWON)" and the like.

Commercially available products of the (meth) acrylate compound include, for example, "EM223 (tripropylene glycol diacrylate; C Log P value: 2.17)"; "EM222 (dipropylene glycol diacrylate; C Log P value: 2.36)" "EM235-1 (pentaerythritol triacrylate; C Log P value: 2.38)"). (manufactured by Eternal Materials).

(3.2) Cationic Polymerizable Compound

The term "cationically polymerizable compound" refers to a compound having a cationically polymerizable group in its molecule. Examples of the cationically polymerizable compound include epoxy compounds, vinyl ether compounds, and oxetane compounds. These may be contained alone, or two or more kinds thereof may be contained.

(3.2.1) Epoxy Compound

Examples of the epoxy compound include aromatic epoxides, alicyclic epoxides, and aliphatic epoxides. Among these, from the viewpoint of enhancing curability, an aromatic epoxide or an alicyclic epoxide is preferable.

Examples of the aromatic epoxide include diglycidyl ether or polyglycidyl ether which is obtained by reacting a polyhydric phenol or an alkylene oxide adduct thereof with epichlorohydrin. Examples of the polyhydric phenol or the alkylene oxide adduct thereof to be reacted include bisphenol A or an alkylene oxide adduct thereof. Examples of the alkylene oxide in the alkylene oxide adduct include ethylene oxide, propylene oxide, and the like.

Examples of the alicyclic epoxide include a cycloalkane oxide-containing compound obtained by epoxidizing a cycloalkane-containing compound with an oxidizing agent such as hydrogen peroxide and peracids. Examples of the cycloalkane in the cycloalkane oxide-containing compound include cyclohexene and cyclopentene.

Examples of the aliphatic epoxide include a diglycidyl ether or a polyglycidyl ether obtained by reacting an aliphatic polyhydric alcohol or an alkylene oxide adduct thereof with epichlorohydrin. Examples of the aliphatic polyhydric alcohols include alkylene glycols such as ethylene glycols, propylene glycols, and 1,6-hexanediol. Examples of the alkylene oxide in the alkylene oxide adduct include ethylene oxide, propylene oxide, and the like.

(3.2.2) Vinyl Ether Compound

Examples of the vinyl ether compound include monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl ether-o-propylene carbonate, dodecyl vinyl ether, diethylene glycol monovinyl ether, octadecyl vinyl ether, and the like.

Examples of the vinyl ether compound include divinyl ether compound, trivinyl ether compound, or the like such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, trimethylolpropane trivinyl ether and the like. From the viewpoint of curability, adhesion, and the like, a divinyl ether compound or a trivinyl ether compound is preferable.

(3.2.3) Oxetane Compound

The oxetane compound is a compound having an oxetane ring. Examples of the oxetane compound include oxetane compounds described in Japanese Unexamined Patent Publication No. 2001-220526, Japanese Unexamined Patent Publication No. 2001-310937, Japanese Unexamined Patent Publication No. 2005-255821. Specifically, examples thereof include the compound represented by general formula (1) described in paragraph 0089 of Japanese Unexamined Patent Publication No. 2005-255821, the compound represented by general formula (2) described in paragraph 0092 of the same, the compound represented by general formula (7) in paragraph 0107, the compound represented by general formula (8) in paragraph 0109, and the compound represented by general formula (9) in paragraph 0116.

3. Method for Producing Pigment Dispersion Composition

The method of preparing (producing) the pigment dispersion composition is not particularly limited, and the pigment dispersion composition can be prepared by a known method. The dispersion medium of the pigment dispersion composition is preferably a low-molecular-weight polymerizable compound having a relatively low viscosity from the viewpoints of dispersibility and handling properties with the polymerizable compound.

The pigment dispersion composition can be prepared by dispersing a pigment in a dispersion medium using the above-described dispersant. The pigment can be dispersed using, for example, a ball mill, a sand mill, an attritor, a roll mill, an agitator, a Henschel mixer, a colloid mill, an ultrasonic homogenizer, a pearl mill, a wet jet mill, or a paint shaker.

The volume-average particle diameter of the pigments in the pigment dispersion composition is preferably in a range of 90 to 180 nm, and more preferably in a range of 110 to 140 nm. The particle size of the pigment can be measured using, for example, a particle size analyzer "Zetasizer Nano" (manufactured by Malvern Panalytical Ltd).

4. Dispersion Composition

The dispersion composition of the present invention is a dispersion composition containing a dispersant and a dispersion medium, and the dispersant is a polyallylamine having an alkyl ester side chain, and a 1-octanol/water partition coefficient C Log P value, which is a predicted value, of the dispersion medium is in a range of 2.0 to 2.4.

That is, in the pigment dispersion composition, the dispersoid is the pigment, but in the dispersion composition, the dispersoid may be a component other than the pigment. The combination of the dispersant and the dispersion medium improves the dispersibility of the specific dispersoid. The dispersoid preferably has a sulfo group or a sulfonic acid derivative group. The dispersoid is not limited to a pigment, but may be functional particles.

5. Configuration of Active Energy Ray Curable Ink Composition

The active energy ray curable ink composition of the present invention is characterized by containing the pigment dispersion composition.

That is, the ink of the present invention contains the above-described pigment, dispersant, and dispersion medium. In addition, a gelling agent, a fatty acid, a polymerization initiator, a polymerization initiation aid, a polymerization inhibitor, and the like may be contained.

(1) Gelling Agent

In the present invention, the "gelling agent" refers to an organic substance which is solid at normal temperature and becomes liquid when heated. The gelling agent preferably has a melting point in a range of 30 to 150° C. The gelling agent is preferably dissolved in the polymerizable compound described below at a temperature higher than the gelation temperature. The gelling agent is preferably crystallized in the ink at a temperature equal to or lower than the gelation temperature.

The "sol-gel phase transition temperature" refers to a temperature of a change (transition) point at which a change (transition) from a sol state to a gel state occurs. The "sol-gel phase transition temperature" is synonymous with terms referred to as a gel transition temperature, a gel dissolution temperature, a gel softening temperature, a sol-gel transition point, and a gelation point.

When the gelling agent is crystallized in the ink, it is preferable that plate crystals that are crystallized products of the gelling agent form a space that is three dimensionally surrounded. In addition, it is preferable that the plate crystals encapsulate a polymerizable compound in the formed space. Such a structure in which the polymerizable compound is included in the three dimensional space formed by the plate crystal is referred to as a "card house structure".

By the formation of the card house structure, the liquid polymerizable compound can be held, and the liquid droplets of the ink can be fixed (pinned). Then, the coalescence of the liquid droplets can be suppressed. In order to form the card house structure, it is preferable that the polymerizable compound and the gelling agent dissolved in the ink are compatible with each other. In a case where the polymerizable compound and the gelling agent dissolved in the ink are phase-separated, it is difficult to form the card house structure.

The gelling agent is not particularly limited.

Examples of the gelling agent include ketone waxes such as dilignoceryl ketone, dibehenyl ketone, distearyl ketone, dieicosyl ketone, dipalmityl ketone, dilauryl ketone, dimyristyl ketone, myristyl palmityl ketone, and palmityl stearyl ketone.

Ester waxes such as behenyl behenate, icosyl icosanoate, stearyl stearate, palmityl stearate, cetyl palmitate, myristyl myristate, cetyl myristate, and myricyl cerotate.

petroleum-based waxes such as paraffin wax, microcrystalline wax, and petrolatum;

Vegetable waxes such as candelilla wax, carnauba wax, rice wax, Japan wax, jojoba oil, jojoba solid wax, and jojoba ester;

animal waxes such as beeswax, lanolin, and spermaceti;

mineral-based wax such as montan wax and hydrogenated wax;

hydrogenated castor oil or a hydrogenated castor oil derivative;

Modified waxes such as montan wax derivatives, paraffin wax derivatives, microcrystalline wax derivatives, and polyethylene wax derivatives.

higher alcohols such as stearyl alcohol and behenyl alcohol;

hydroxystearic acid such as 12-hydroxystearic acid and the like;

12-hydroxystearic acid derivatives;

fatty acid amides such as lauric acid amide, stearic acid amide, behenic acid amide, oleic acid amide, erucic acid amide, ricinoleic acid amide, and 12-hydroxystearic acid amide; N-substituted fatty acid amides such as N-stearyl stearic acid amide and N-oleyl palmitic acid amide;

special fatty acid amides such as N, N'-ethylenebisstearylamide, N, N'-ethylenebis-12-hydroxystearylamide, and N, N'-xylylenebisstearylamide;

higher amines such as dodecylamine, tetradecylamine, octadecylamine and the like;

fatty acid ester compounds such as stearyl stearic acid, oleyl palmitic acid, glycerin fatty acid ester, sorbitan fatty acid ester, propylene glycol fatty acid ester, ethylene glycol fatty acid ester, and polyoxyethylene fatty acid ester;

esters of sucrose fatty acids such as sucrose stearic acid and sucrose palmitic acid;

synthetic waxes such as polyethylene wax and α-olefin-maleic anhydride copolymer wax;

dimer acid;

dimer diol and the like are included.

These may be contained alone or in combination of two or more kinds thereof.

As the gelling agent, a commercially available product may be used.

Examples of commercially available products of ketone wax include "18-Pentatriacontanon" (manufactured by Alfa Aeser), "Hentriacontan-16-on" (manufactured by Alfa Aeser), and "KAO (registered trademark) Wax T1" (manufactured by Kao Corp.).

Examples of the ester wax include "UNISTER (registered trademark) M-2222SL" (manufactured by Nof Corp.), "EXCEPARL (registered trademark) SS" (manufactured by Kao Corp., melting point 60° C.), "EMALEX (registered trademark) CC-18" (manufactured by Nihon Emulsion Co., Ltd), "AMREPS (registered Japanese trademark) PC" (manufactured by Kokyu Alcohol Kogyo Co., Ltd.), "EXCEPARL (registered trademark) MY-M" (manufactured by Kao Corp.), "SPERMACETI" (manufactured by Nof Corp.), "EMALEX (registered trademark) CC-10" (manufactured by Nihon Emulsion Co., Ltd) and the like.

Examples of commercially available products of the fatty acid amide include "Nikkaamide (registered trademark) series" (manufactured by Nippon Kasei Chemical Co., Ltd), "ITOWAX series" (manufactured by Itoh Oil Chemicals Co., Ltd), and "FATTYAMID series" (manufactured by Kao Corp.).

Examples of commercially available products of fatty acid ester compounds include "EMALLEX (registered trademark) series" (manufactured by Nihon Emulsion Co., Ltd), "RIKEMAL (registered trademark) series" (manufactured by Riken Vitamin Co., Ltd), "POEM (registered trademark) series and the like" (manufactured by Riken Vitamin Co., Ltd) and the like.

Examples of commercially available products of sucrose fatty acid esters include "Ryoto Sugar Ester (registered trademark) Series" (manufactured by Mitsubishi Chemical Foods Corporation).

Examples of commercially available products of the synthetic wax include "UNILIN (registered trademark) series" (manufactured by Baker-Petrolite Co., Ltd).

Examples of commercially available products of the dimer diol include "PRIPOR series" (manufactured by CRODA).

Among these, the gelling agent is preferably a ketone wax, an ester wax, a higher fatty acid, a higher alcohol, or a fatty acid amide. In addition, ketone wax or ester wax is more preferable.

Particularly preferable examples of the gelling agent include compounds represented by the following general formula (G1) or (G2).

$R_{21}$—CO—$R_{22}$ General formula (G1):

$R_{23}$—COO—$R_{24}$ General formula (G2):

In the formula, $R_{21}$ to $R_{24}$ each independently represents an alkyl chain which has a linear portion having 12 or more carbon atoms and may have a branch.

The general formula (G1) is referred to as ketone wax, and the general formula (G2) is referred to as fatty acid ester. These gelling agents can gelate ink droplets more stably with high reproducibility. Therefore, it is possible to suppress coalescence of ink droplets (dots) landed on the printing medium.

The sol-gel phase transition temperature of the ink can be arbitrarily set. The sol-gel phase transition temperature is preferably within a range of 30 to 100° C. from the viewpoint of stable ejection properties of ink droplets, adverse effects associated with high-temperature heating, and the like. Further, the sol-gel phase transition temperature is preferably a temperature between the temperature of the ink in the inkjet head and the temperature of the printing medium.

The method for measuring the sol-gel phase transition temperature includes, for example, placing a gel-like test piece on a heat plate. Next, the heat plate is heated, the temperature at which the shape of the test piece collapses is measured, and this temperature can be determined as the sol-gel phase transition temperature. The viscoelasticity can also be measured using a commercially available viscoelasticity measuring apparatus, for example, a viscoelasticity measuring apparatus "MCR300" (manufactured by Physica).

The sol-gel phase transition temperature can be adjusted by the type, content, and the like of a polymerizable compound described later and the like.

When the temperature of the liquid droplets of the ink ejected from the inkjet head and landed on the printing medium is decreased to a temperature lower than the sol-gel phase transition temperature, the liquid droplets of the ink rapidly become a gel state. Therefore, mixing of dots (ink droplets) and coalescence of dots are suppressed, and a high-quality image can be formed even in high-speed printing. Thereafter, the gelled ink droplets are cured by being irradiated with an active energy ray, and thus are fixed on the printing medium to form a strong image film.

Since the liquid droplets of the ink landed on the printing medium are rapidly gelated, it is difficult for the liquid droplets of the ink to be diffused on the printing medium, and it is possible to prevent oxygen from entering the liquid droplets of the ink. Therefore, the curing of the ink is hardly influenced by oxygen inhibition.

The content of the gelling agent is preferably in a range of 1 to 10% by mass and more preferably in a range of 1 to 7% by mass with respect to the total mass of the ink. In a case of containing two or more kinds of gelling agents, it is preferable that the total mass of these is within the above-described range. When the content of the gelling agent is 1% by mass or more, the ink sufficiently undergoes sol-gel phase transition. When the content of the gelling agent is 10% by mass or less, stability of ink ejection from the inkjet head can be obtained.

(2) Fatty Acid

The ink of the present invention may further contain a fatty acid. When the fatty acid is contained, the storage stability and the ejection stability of the ink are improved. Furthermore, when the fatty acid is contained, the surface slidability of the ink is good when the ink is ejected onto the printing medium.

The fatty acid is preferably a compound having a carbon number of 12 or more.

Fatty acids include, for example, behenic acid ($C_{22}H_{44}O_2$), arachidic acid ($C_{20}H_{40}O_2$), stearic acid ($C_{18}H_{36}O_2$), palmitic acid ($C_{16}H_{32}O_2$), myristic acid ($C_{14}H_{28}O_2$), lauric acid ($C_{12}H_{24}O_2$), oleic acid ($C_{18}H_{34}O_2$), erucic acid ($C_{22}H_{42}O_2$) and the like.

As the fatty acid, a commercially available product may be used.

Examples of the commercially available product include "Lunac (registered trademark) BA", "Lunac (registered trade mark) S-90V", "Lunac (registered trademark) S-98", "Lunac (registered trademark) P-70", "Lunac (registered trademark) P-95", "Lunac (registered trademark) MY-98", "Lunac (registered trademark) L-70", "LUNAC (registered trademark) L-98" (above, Kao Corp.), "NAA (registered trademark)-222S Beads", "NAA (registered trademark)-222 Powder", "Bead Stearic Acid Cherry", "Bead Stearate *Camellia*", "Powdered Cherry Stearate", "Powdered *Camellia* Stearate", "NAA (registered trademark)-160", "NAA (registered trademark)-142", "NAA (registered trademark)-122", "NAA (registered trademark)-34", "NAA (registered trademark)-35", erucic acid (above, Nof Corp.) and the like.

The content of the fatty acid is preferably in a range of 0.01 to 10 mass ppm, and more preferably in a range of 0.01 to 0.18 mass ppm with respect to the total mass of the ink. When the content is 0.01 mass ppm or more, the storage stability and the ejection stability of the ink are good. Furthermore, when the ink is ejected onto the printing medium, the surface slidability of the ink is good, and so-called sheet jam can be suppressed. When the content is 10 ppm by mass or less, the storage stability of the ink is good.

(3) Polymerization Initiator

The ink of the present invention may further contain the polymerization initiator. Specifically, the polymerization initiator may not be contained when the active energy rays are electron beams, but the polymerization initiator is preferably contained when the active energy rays are ultraviolet rays.

The polymerization initiator includes an intramolecular bond cleavage type and an intramolecular hydrogen abstraction type.

Examples of the intramolecular bond-cleavage type polymerization initiator include acetophenones such as diethoxyacetophenone, 2-hydroxy-2-methyl-1-phenylpropan-1-one, benzyl dimethyl ketal, 1-(4-isopropylphenyl)-2-hydroxy-2-methylpropan-1-one, 4-(2-hydroxyethoxy) phenyl-(2-hydroxy-2-propyl) ketone, 1-hydroxycyclohexyl-phenylketone, 2-methyl-2-morpholino (4-thiomethylphenyl) propan-1-one, 2-benzyl-2-dimethylamino-1-(4-morpholinophenyl)-butanone, etc.; benzoins such as benzoin, benzoin methyl ether, benzoin isopropyl ether, etc.; acylphosphine oxides such as 2,4,6-trimethylbenzoin diphenylphosphine oxide, etc.; benzyl glyoxy ester, methylphenylglyoxy ester and the like.

An example of the intramolecular hydrogen abstraction type polymerization initiator includes benzophenones such as benzophenone, methyl o-benzoylbenzoate-4-phenylbenzophenone, 4,4'-dichlorobenzophenone, hydroxybenzophenone, 4-benzoyl-4'-methyl-diphenyl sulfide, acrylated benzophenone, 3,3',4,4'-tetra (t-butylperoxycarbonyl) benzophenone, 3,3'-dimethyl-4-methoxybenzophenone, etc.; thioxanthones such as 2-isopropylthioxanthone, 2,4-dimethylthioxanthone, 2,4-diethylthioxanthone, 2,4-dichlorothioxanthone; aminobenzophenone-based such as Michler's ketone, 4,4'-diethylaminobenzophenone, etc.; 10-butyl-2-chloroacridone, 2-ethylanthraquinone, 9,10-phenanthrenequinone, camphorquinone and the like.

Although depending on the constituent components of the ink, the content of the polymerization initiator is preferably within a range of 0.01 to 10% by mass relative to the total mass of the ink.

The ink according to the present invention may contain a photoacid generator as the polymerization initiator. Examples of the photoacid generator include compounds used for a chemically amplified photoresist or photocationic polymerization. Details are described in "Organic Materials for Imaging", edited by the Society for the Study of Organic Electronics Materials, Bunshin Shuppan (1993), pages 187 to 192.

(4) Polymerization Initiator Aid

The ink of the present invention may further contain a polymerization initiator aid.

Examples of the polymerization initiation aid include tertiary amine compounds, and among these, aromatic tertiary amine compounds are preferable.

Examples of the aromatic tertiary amine compound include N,N-dimethylaniline; N,N-diethylaniline; N,N-dimethyl-p-toluidine; n,N-dimethylamino-p-benzoic acid ethyl ester, N,N-dimethylamino-p-benzoic acid isoamylethyl ester, N,N-dihydroxyethylaniline, triethylamine, N,N-dimethylhexylamine, and the like.

Among these, the aromatic tertiary amine compound is preferably N,N-dimethylamino-p-benzoic acid ethyl ester or N,N-dimethylamino-p-benzoic acid isoamylethyl ester. These may be contained alone or in combination of two or more kinds thereof.

(5) Polymerization Inhibitor

The ink according to the present invention may further contain a polymerization inhibitor.

Examples of the polymerization inhibitor include (alkyl) phenol, hydroquinone, catechol, resorcin, p-methoxyphenol, t-butylcatechol, t-butylhydroquinone, pyrogallol, 1,1-picrylhydrazyl, phenothiazine, p-benzoquinone, nitrosobenzene, 2,5-di-t-butyl-p-benzoquinone, dithiobenzoyl disulfide, picric acid, cupferron, aluminum N-nitrosophenylhydroxylamine, tri-p-nitrophenylmethyl, N-(3-oxyanilino-1,3-dimethylbutylidene) aniline oxide, dibutylcresol, cyclohexanone oxime cresol, guaiacol, o-isopropylphenol, butyraldoxime, methyl ethyl ketoxime, cyclohexanone oxime and the like.

(6) Others

The ink of the present invention may further contain other components, if necessary. Examples of other components include various additives other than the additives described above, other resins, and the like. Examples of the various additives other than the above-described additives include surfactant, leveling additive, matting agent, ultraviolet absorber, infrared absorbing agent, antimicrobial agent and basic compounds for enhancing the storability of the ink.

Examples of the basic compound include basic alkali metal compounds, basic alkaline earth metal compounds, and basic organic compounds such as amines. Examples of the other resin include a resin for adjusting physical properties of a cured film. Examples of the other resins include, for example, polyester, polyurethane, vinyl resin, acrylic resin, rubber-based resin, and waxes.

6. Physical Properties of Active Energy Ray Curable Ink Composition

The pigment dispersion composition of the present invention has excellent storage stability at 80° C. (high temperature). Along with this, the ink of the present invention also has excellent storage stability at 80° C.

The ink according to the present invention preferably has a viscosity in a range of 3 to 20 mPa s at 80° C. When the content is within the above range, ejection stability of the ink from an inkjet head can be obtained. In addition, it is preferable that viscosity at 25° C. is 1000 mPa·s or more. When the content is within the above range, the ink can be sufficiently gelled when the temperature of the ink is decreased to room temperature after the ink lands on the printing medium.

The ink preferably has a phase transition temperature of a sol-gel phase transition within a range of 40 to 70° C. When the phase transition temperature of the ink is 40° C. or higher, the ink quickly thickens after landing on the printing medium, making it easier to be fixed. In addition, when the phase transition temperature of the ink is 70° C. or lower, ejection stability of the ink is obtained in a case where the temperature at the time of ejection of the ink is set to about 80° C. which is the temperature that the ink is usually used.

The viscosity at 25° C., the viscosity at 80° C., and the phase transition temperature of the ink can be determined by measuring a temperature change in the dynamic viscoelasticity of the ink using a rheometer. For example, the ink is heated to 100° C. and is cooled to 20° C. under conditions of a shear rate of 11.7 (1/s) and a temperature lowering rate of 0.1° C./s while the viscosity is measured by a stress control-type rheometer, to obtain a temperature change curve of the viscosity. As the stress control-type rheometer, for example, "Physica MCR301" (cone plate diameter: 75 mm, cone angle: 1.0°, manufactured by AntonPaar) can be used.

The viscosity at 25° C. and the viscosity at 80° C. are obtained by reading the viscosities at 25° C. and 80° C., respectively, in a viscosity-temperature change curve. The phase transition temperature is determined as a temperature at which the viscosity becomes 200 mPa·s in a temperature change curve of the viscosity.

7. Method for Manufacturing Active Energy Ray Curable Ink Composition

A method of producing an active energy ray curable ink composition according to the present invention is characterized by including a step of preparing the pigment dispersion composition described above, and producing the active energy ray curable ink composition described above. That is, first, the pigment dispersion composition is prepared, and then mixed with other components to prepare the ink.

The pigment dispersion composition contains a polymerizable compound as a dispersion medium, and the polymerizable compound may be further added in the preparation (production) of the ink. The polymerizable compound to be further added may be the same as the polymerizable compound used in the pigment dispersion composition. Furthermore, the polymerizable compound to be further added may be of a different type from the polymerizable compound contained in the pigment dispersion composition.

The method for mixing the constituent components of the ink is not particularly limited, and the constituent components can be mixed by a known method. For example, other constituent components of the ink may be added to the prepared pigment dispersion composition, and mixed with heating. The obtained mixed solution is preferably filtered through a predetermined filter.

8. Printing Method

The printing method of the present invention is characterized by using the active energy ray curable ink composition.

The printing method of the present invention is preferably performed by an inkjet method using the above-described ink. In addition, when a multicolor image is formed using a plurality of types of inks having different compositions, at least one type of the plurality of types of inks is to be the ink according to the present invention.

An inkjet printer is used in the printing method of the present invention. Generally, inkjet printers are classified into an on-demand system and a continuous system according to an ink ejection method. The inkjet printer used in the present invention may be of either type. Examples of the on-demand type inkjet printer include electro-mechanical conversion types including a single cavity type, a double cavity type, a bender type, a piston type, a share mode type, and a shared wall type; and electro-thermal conversion types including a thermal inkjet type and a bubble jet (Bubble Jet is a trademark of CANON INC) type.

Furthermore, inkjet printers are divided into a scanning method and a line method according to the scanning method of the head. The inkjet printer used in the present invention may be of either type. Either method may be selected according to the resolution of the print product (image) and the printing speed. Since the ink of the present invention can be quickly fixed, the print product having high image quality can be obtained even in high-speed printing by a line system.

The printing medium may be any printing medium on which an image can be formed using the ink of the present invention. Examples of printing media include non-absorbent printing media constructed of plastics including polyester, polyvinyl chloride, polyethylene, polyurethane, polypropylene, acrylic resin, polycarbonate, polystyrene, acrylonitrile-butadiene-styrene copolymer, polyethylene terephthalate and polybutadiene terephthalate; non-absorbent inorganic printing media such as metals, glass, etc.; coated sheet for printing, sheet such as coated sheet B for printing, etc.

Examples of the plastic film include a PP film; PET film; OPS film; OPP film; ONy film; PVC film; PE film and TAC film.

(1) Ejecting Ink from Head

In a process of ejecting ink from the head, droplets of ink are ejected from the nozzle of the head. The ejection method is not particularly limited.

The temperature of the ink in the head is preferably in a range of 40 to 120° C., and more preferably in a range of 50 to 85° C. When the temperature of the ink in the head is 40° C. or more, ejection stability of the ink from the head is obtained. In addition, when the temperature is 120° C. or lower, volatilization of the components of the ink can be suppressed, and a thermal load on the head can be reduced.

When the temperature of the ink is within a range of 40 to 120° C., the viscosity of the ink is preferably within a range of 3 to 20 mPa·s.

Furthermore, it is preferable that the temperature of the ink in the head is made higher than the gelation temperature of the ink by 10 to 40° C. When the temperature of the ink in the head is set to be equal to or higher than the gelation temperature+10° C., the ink can be satisfactorily ejected without being gelled in the head or on a nozzle surface. In addition, setting the temperature of ink in the head to the gelation temperature+40° C. or less can reduce the thermal load on the head. In particular, in the head using a piezoelectric element, performance deterioration due to the thermal load is likely to occur, and thus the temperature of the ink in the head is preferably set to be in the above-described range.

The method of heating the ink is not particularly limited. For example, the ink can be heated by heating at least one of an ink supply system, a pipe with a filter, a piezoelectric head, and the like with a panel heater, a ribbon heater, heat-retaining water, or the like. Examples of the ink supply system include an ink tank constituting a head carriage, a supply pipe, and a front chamber ink tank immediately before the head.

From the viewpoint of printing speed and image quality, the droplet amount of the ink at the time of ejection is preferably within a range of 2 to 20 pL.

(2) Landing Ink on Printing Medium

In the step of directly landing the ink on the printing medium, the ink ejected in the preceding step is landed on the printing medium.

From the viewpoint of fixing of the ink, the temperature of the printing medium is preferably lower than the temperature at the time of ejection of the ink and 60° C. or lower.

When the temperature of the printing medium is 60° C. or lower, the viscosity of the landed ink is rapidly increased, so that the ink can be fixed.

(3) Irradiating Ink with Active Energy Rays to Cure Ink

In the process of curing the ink by irradiating the ink with active energy rays, the surface of the printing medium on which the ink has landed is irradiated with active energy rays.

As described above, examples of the active energy rays include visible rays, ultraviolet rays, X-rays, electron beams, α-rays, β-rays, and γ-rays. Among these, irradiation with ultraviolet rays is preferable from the viewpoint of ease of handling and less influence on a human body. In addition, it is preferable to irradiate an electron beam from the viewpoint of easily curing the ink.

The light source of the ultraviolet rays is preferably a light emitting diode (LED). By using the LED, it is possible to prevent ink from being melted by radiation heat of the light source and curing failure of the ink from occurring. Examples of the LED light source include a water-cooled LED having a wave length of 395 nm, and examples thereof include those manufactured by Phoseon Technology, Heraeus, KYOCERA, HOYA, and Integration Technology.

The amount of energy of the active energy rays to be applied is preferably within a range of 200 to 1000 mJ/$cm^2$. When the amount of energy is 200 mJ/$cm^2$ or more, the polymerizable compound can be sufficiently polymerized and crosslinked. When the energy amount is 1000 mJ/$cm^2$ or less, a decrease in the viscosity of the ink due to heat of active energy rays can be suppressed, and a decrease in the pinning property can be suppressed. From the above-described viewpoint, the energy amount of the active energy rays to be applied is more preferably in a range of 300 to 800 mJ/$cm^2$ and even more preferably in a range of 350 to 500 mJ/$cm^2$.

(4) Drying Ink

In the step of drying the ink, after the ink is irradiated with active energy rays, drying is performed as necessary. The drying method may be air drying or drying by heat application, but drying by heat application is preferable.

9. Printing System

A printing system according to the present invention includes the ink described above. In addition, the printing system of the present invention is a system that performs printing by landing the ejected ink on the printing medium. That is, the printing system of the present invention includes a printing apparatus and the above-described ink.

The printing apparatus included in the printing system of the present invention will be described. Note that although an apparatus that performs printing by a single-pass method is described below, the ink of the present invention is also used for an apparatus that performs printing by a scanning method.

FIGURE is a schematic diagram illustrating an exemplary configuration of a printing apparatus 100 used in the present invention. As illustrated in FIGURE, the printing apparatus 100 includes an inkjet head 110, a conveyance path 120, an active energy ray irradiation section 130, and a temperature controller 140. In FIGURE, an arrow A indicates a conveyance direction of the printing medium 150. The inkjet head 110 and the active energy ray irradiation section 130 are arranged in this order in contact with the conveyance path 120 from the upstream side to the downstream side in the conveyance direction of the printing medium. Note that the printing apparatus 100 may have an oxygen concentration adjustment section (not illustrated) for adjusting the oxygen concentration when the ink is irradiated with active energy rays.

As illustrated in FIGURE, the printing apparatus 100 includes an ink channel 170 and an ink tank 180 that stores ink to be supplied through the ink channel 170. The ink channel 170 is connected to a head carriage 160 that houses the inkjet head 110 for ink.

The head carriage 160 houses each of the inkjet heads 110. The head carriage 160 includes inkjet heads for respective colors of yellow (Y), magenta (M), cyan (C), and black (K). The head carriage 160 is, for example, fixedly disposed so as to cover the entire width of the printing medium 150.

The ink tank 180 stores ink of each color. The inkjet head 110 is supplied with ink from the ink tank 180. Note that the ink of the present invention may be used for all of the yellow (Y), magenta (M), cyan (C), and black (K) inks, or the ink of the present invention may be used for only some of the inks. In particular, the ink of the present invention is preferably used as a cyan ink, a magenta ink, or a black ink.

The inkjet head 110 ejects ink supplied from the ink tank 180 to the head carriage 160 via the ink channel 170. At this time, the ink is preferably heated via the ink tank 180, the ink channel 170, the head carriage 160, the inkjet head 110, and the like. As described above, the temperature of the ejected ink is preferably within a range of 40 to 120° C., and more preferably within a range of 50 to 85° C.

The active energy ray irradiation section 130 covers the entire width of the printing medium 150, and is arranged on the downstream side of the head carriage 160 in the conveyance direction A of the printing medium 150. The active energy ray irradiation section 130 emits active energy rays to the ink droplets ejected by the inkjet heads 110 and landed on the printing medium 150 to cure the droplets.

The temperature controller 140 is disposed on a lower surface of the printing medium 150. The temperature controller 140 adjusts the temperature of the surface of the printing medium 150 to be lower than the temperature at the time of ink ejection and 60° C. or less. Examples of the temperature controller 140 include various heaters. Thus, the ink of the present invention is quickly fixed after landing on the printing medium 150. Therefore, the ink of the present invention has high pinning properties and can suppress the bleeding of the polymerizable compound from the formed dot.

In addition, an oxygen concentration adjustment section (not illustrated) adjusts the oxygen concentration of an atmosphere which takes in the surface of the ink landed on the printing medium 150 when the active energy ray is irradiated.

EXAMPLES

Hereinafter, the present invention will be specifically described with reference to Examples, but the present invention is not limited thereto. In the examples, "part(s)" or "%" means "part(s) by mass" or "% by mass" unless otherwise specified.

In the following examples, operations were performed at room temperature (25° C.) unless otherwise specified.

1. Preparation of Pigment Dispersion Composition (1) Preparation of Pigment Dispersion Composition 1

The following components and 0.3 mm zirconia beads "YTZ ball" (manufactured by NIKKATO CORPORATION) were placed in a 100 mL plastic container. Then, the mixture was dispersed with a paint shaker for 3 hours, and then the zirconia beads were removed to obtain a pigment dispersion composition 1.

- Cyan pigment "Paliogen (registered trademark) Blue EH 1900" (DIC Corporation) 20.0 parts by mass
- Polymeric pigment dispersant "Ajisper PB881" (manufactured by Ajinomoto Fine—Techno Co., Inc) 6.5 parts by mass
- Phenol EO-modified acrylate "Miramer (registered trademark) M144" (manufactured by MIWON 73.2 parts by mass
- Photopolymerization inhibitor "Irgastab (registered trademark) UV10" (manufactured by BASF) 0.3 parts by mass (2) Preparation of Pigment Dispersion Compositions 2 to 20

Pigment dispersion compositions 2 to 20 were obtained in the same procedure as in the pigment dispersion composition 1 except that the pigment, the dispersant, and the dispersion medium were changed as described in Table 1.

2. Ink Preparation (1) Preparation of Ink 1

The obtained pigment dispersion composition 1 and the following components were mixed, followed by stirring at 105° C. for 45 minutes. Thereafter, the mixture was filtered through a 3-μm membrane filter (Teflon (registered trademark) manufactured by ADVANTEC) to obtain ink 1.

- Pigment Dispersion Composition 1 (solid concentration: 26.5% by mass) 10.0 parts by mass
- Polyethylene glycol #400 diacrylate 43.9 parts by mass
- 4EO modified pentaerythritol tetraacrylate 25.0 parts by mass
- 3PO modified trimethylolpropane triacrylate 15.0 parts by mass
- Photopolymerization initiator "IRGACURE (registered trademark) 819" (manufactured by BASF) 6.0 parts by mass
- Photopolymerization inhibitor "Irgastab (registered trademark) UV10" (manufactured by BASF) 0.1 parts by mass (2) Preparation of Inks 2 to 20

Inks 2 to 20 were prepared in the same procedure as in the preparation of Ink 1 except that the types and the contents of the pigment, the dispersant, and the additive were changed as described in Table II.

3. Evaluation (1) Storage Stability of Pigment Dispersion Composition at High Temperature (Evaluation of Pigment Dispersion Composition)

For each of the pigment dispersion compositions, the volume average particle diameter of the pigment was measured using a particle size analyzer "Zetasizer Nano" (manufactured by Malvern Panalytical Ltd). Next, each pigment dispersion composition was stored at 80° C. for 1 week, and then the volume average particle diameter of the pigment was measured using the same apparatus.

The amount of change in the volume average particle diameter of the pigment between before and after the storage at a high temperature (80° C.) was calculated and evaluated according to the following criteria. C or higher (A to C) was determined to have no practical problem.

A: An amount of change in particle size is 5 nm or less.

B: The amount of change in particle size is within a range of more than 5 nm to 10 nm or less.

C: The amount of change in particle size is within a range of more than 10 nm to 20 nm or less.

D: The amount of change in particle size is more than 20 nm.

(2) Migration of Printed Product (Evaluation of Printed Product)

Printing was performed using each ink, and the printed product was evaluated.

An inkjet recording apparatus "KM512MHX" (manufactured by Konica Minolta, Inc) having an inkjet recording head was prepared. Note that the inkjet recording head included a piezo-type inkjet nozzle.

Each ink was ejected from the inkjet recording apparatus. A 10 cm×10 cm solid image was formed on "OK Top Coat" coated sheet for printing (basis weight 128 $g/m^2$, Oji Paper Co., Ltd.) at a resolution of 720×720 dpi. The solid image was then irradiated with UV light at 450 nm for a total of 350 mJ.

A total of 5 print products obtained by the same procedure were immersed in a container containing 100 mL at 40° C. for 72 hours. Next, the coated sheet for printing on which the solid image was formed was taken out from the container. Next, the water in the container was removed under reduced pressure, and the amount of the residue was measured and evaluated according to the following criteria. C or higher (A to C) was determined to have no practical problem.

Note that the term "migration" used herein refers to a phenomenon in which part of ink cannot be sufficiently fixed to the printing coated sheet and is moved from the printing coated sheet. Some of the ink migrates from the printing coated sheet and dissolves in the water in which it is immersed. Then, when water is removed from the liquid in the container after the immersion, a part of the moved ink precipitates as the residue. The residue includes components of the ink, in particular, the pigment, the polymerizable compound, and the like.

A: The amount of the residue is 3 mg or less.

B: The amount of the residue is greater than 3 mg and less than or equal to 10 mg.

C: The amount of the residue is greater than 10 mg and less than or equal to 20 mg.

D: The amount of residue is greater than 20 mg.

The composition of the pigment dispersion compositions 1 to 20 and the inks 1 to 20 are illustrated in Tables I and II. The results of evaluation of the respective inks are shown in Tables I and II.

Details of the pigment, the dispersant, and the dispersion medium described in Tables I and II are described below.

(Pigment)

EH 1900: "Paliogen (registered trademark) Blue EH 1900" (manufactured by DIC Corporation)

6112JC: "Chromofine (registered trademark) Red 6112JC" (manufactured by Dainichiseika Color & Chemicals Mfg. Co., Ltd)

RGT: "FASTOGEN (registered trademark) SUPER MAGENTA RGT" (manufactured by DIC Corporation)

JM04: "FASTOGEN (registered trademark) SUPER MAGENTA JM04" (manufactured by DIC Corporation)

5R-763: "5R-763" (manufactured by Fuji Pigment Co., Ltd)

6B 690: "6B 690" (manufactured by Fuji Pigment Co., Ltd)

MA-7: "Mitsubishi (registered trademark) carbon black MA-7" (manufactured by Mitsubishi Chemical Corporation)

7061B: "FASTOGEN (registered trademark) SUPER RED 7061B" (Pigment Violet-19, manufactured by DIC Corporation).

Note that pigments other than "7061B" contain a compound having a sulfo or sulfonate derivative group. "7061B" mainly contains quinacridone without sulfo or sulfonic acid derivative groups.

(Dispersant)

PB881: "Ajisper PB881" (manufactured by Ajinomoto Fine—Techno Co., Inc)

SOLSPERSE 32000: "SOLSPERSE 32000" (manufactured by Lubrizol Corporation, Japan)

SOLSPERSE 33000: "SOLSPERSE 33000" (manufactured by Lubrizol Corporation, Japan)

PB824: "Ajisper PB824" (manufactured by Ajinomoto Fine—Techno Co., Inc)

PB821: "Ajisper PB821" (manufactured by Ajinomoto Fine—Techno Co., Inc)

TEGO Dispers 650: "TEGO (registered trademark) Dispers 650" (manufactured by Evonik Japan Co., Ltd)

Note that dispersants other than "TEGO Dispers 650" contain a polyallylamine having an alkyl ester side chain. The "TEGO Dispers 650" mainly contains a polyether-based compound.

(Dispersion Medium)

M144: "Miramer (registered trademark) M144" (C Log P value: 2.27, phenol EO-modified acrylate, manufactured by MIWON).

M222: "Miramer (registered trademark) M222" (C Log P value: 2.04, dipropylene glycol diacrylate, manufactured by MIWON).

M216: "Miramer (registered trademark) M216" (C Log P value: 3.33, neopentyl glycol PO-modified diacrylate, manufactured by MIWON).

M220: "Miramer (registered trademark) M220" (C Log P value: 2.17, tripropylene glycol diacrylate, manufactured by MIWON).

D0498: Diethylene glycol divinyl ether (product code: D0498, C Log P value: 0.468, manufactured by Tokyo Chemical Industry Co., Ltd)

P2928: Polyethylene glycol diglycidyl ether (product code: P2928, C Log P value: −4.36, manufactured by Tokyo Chemical Industry Co., Ltd).

Note that M144 is a compound having a repeating structure derived from ethylene oxide (EO modification). M222, M216 and M220 are compounds having a repeating structure derived from propylene oxide (PO modification).

TABLE I

| | PIGMENT DISPERSION COMPOSITION | | | | | | |
|---|---|---|---|---|---|---|---|
| | INK No. | No. | PIGMENT | DISPERSANT | DISPERSION MEDIUM | STORAGE STABILITY | MIGRATION |
| EXAMPLE 1 | 1 | 1 | EH 1900 | PB881 | M144 | B | A |
| EXAMPLE 2 | 2 | 2 | EH 1900 | PB881 | M222 | A | A |
| EXAMPLE 3 | 3 | 3 | EH 1900 | SOLSPERSE 32000 | M222 | A | B |
| EXAMPLE 4 | 4 | 4 | EH 1900 | PB881 | M216 | C | B |
| EXAMPLE 5 | 5 | 5 | EH 1900 | SOLSPERSE 32000 | M216 | B | C |
| EXAMPLE 6 | 6 | 6 | 6112JO | PB881 | M222 | A | A |
| EXAMPLE 7 | 7 | 7 | 6112JC | SOLSPERSE 32000 | M222 | A | B |
| EXAMPLE 8 | 8 | 8 | 6112JC | PB881 | M216 | B | B |
| EXAMPLE 9 | 9 | 9 | 6112JC | SOLSPERSE 32000 | M216 | B | C |
| EXAMPLE 10 | 10 | 10 | RGT | SOLSPERSE 33000 | M222 | A | A |

TABLE II

| | PIGMENT DISPERSION COMPOSITION | | | | | | |
|---|---|---|---|---|---|---|---|
| | INK No. | No. | PIGMENT | DISPERSANT | DISPERSION MEDIUM | STORAGE STABILITY | MIGRATION |
| EXAMPLE 11 | 11 | 11 | RGT | SOLSPERSE 33000 | M220 | A | A |
| EXAMPLE 12 | 12 | 12 | JM04 | PB824 | M220 | A | B |
| EXAMPLE 13 | 13 | 13 | 5R-763 | SOLSPERSE 33000 | M220 | A | A |
| EXAMPLE 14 | 14 | 14 | 6B 690 | SOLSPERSE 33000 | M220 | B | B |
| EXAMPLE 15 | 15 | 15 | MA-7 | PB821 | M220 | A | A |
| EXAMPLE 16 | 16 | 16 | RGT | PB821 | D0498 | C | C |
| EXAMPLE 17 | 17 | 17 | RGT | PB821 | P2928 | C | C |
| COMPARATIVE EXAMPLE 1 | 18 | 18 | 7061B | SOLSPERSE 33000 | M220 | D | D |
| COMPARATIVE EXAMPLE 2 | 19 | 19 | RGT | TEGO Dispers 650 | M220 | D | C |
| COMPARATIVE EXAMPLE 3 | 20 | 20 | RGT | TEGO Dispers 650 | D0498 | D | D |

It is clear from the Examples and the Comparative Examples that the pigment dispersion composition of the present invention can improve the dispersibility of a pigment. Specifically, the dispersibility of the pigment at high temperature is improved, and the migration of the pigment in the print product can be suppressed.

Comparison of Examples 1 to 5 shows that the dispersibility of the pigment can be improved when the C Log P value of the dispersion medium is within a range of 2.0 to 2.4.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese Patent Application No. 2023-122940, filed on Jul. 28, 2023 including description, claims, drawings and abstract is incorporated herein by reference.

The invention claimed is:

1. A pigment dispersion composition comprising:

a pigment; a dispersant; and a dispersion medium, wherein, the pigment includes a sulfo group or a sulfonic acid derivative group, the dispersant is polyallylamine including an alkyl ester side chain, and the dispersion medium comprises a radically polymerizable monomer.

2. The pigment dispersion composition according to claim 1, wherein the dispersion medium is acrylate or methacrylate.

3. The pigment dispersion composition according to claim 1, wherein a 1-octanol/water partition coefficient C Log P value, which is a predicted value, of the dispersion medium is in a range of 2.0 to 2.4.

4. The pigment dispersion composition according to claim 2, wherein the acrylate or methacrylate includes a repeating structure derived from ethylene oxide or propylene oxide.

5. The pigment dispersion composition according to claim 1, wherein the dispersant includes a repeating structure represented by a following general formula (1):

GENERAL FORMULA (1)

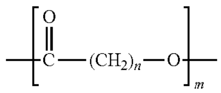

wherein m represents an integer within a range of 2 to 100, and n represents an integer within a range of 2 to 20.

6. An active energy ray curable ink composition comprising:

the pigment dispersion composition according to claim 1; and a photopolymerization initiator.

7. The active energy ray curable ink composition according to claim 6, further containing a gelling agent.

8. A manufacturing method of an active energy ray curable ink composition for manufacturing the active energy ray curable ink composition according to claim 6, the method comprising:

preparing a pigment dispersion composition.

9. A printing method comprising:

the active energy ray curable ink composition according to claim 6.

10. A printing system comprising:

the active energy ray curable ink composition according to claim 6.

* * * * *